(12) United States Patent
Toshi et al.

(10) Patent No.: US 9,366,850 B2
(45) Date of Patent: Jun. 14, 2016

(54) MICROSCOPE OBJECTIVE LENS

(71) Applicant: NIKON CORPORATION, Tokyo (JP)

(72) Inventors: Taeko Toshi, Tokyo (JP); Kazuhiro Takasago, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 522 days.

(21) Appl. No.: 13/709,785

(22) Filed: Dec. 10, 2012

(65) Prior Publication Data

US 2013/0135739 A1    May 30, 2013

Related U.S. Application Data

(63) Continuation of application No. PCT/JP2011/063477, filed on Jun. 13, 2011.

(30) Foreign Application Priority Data

Jun. 16, 2010 (JP) ................................. 2010-136728
Jun. 16, 2010 (JP) ................................. 2010-136729

(51) Int. Cl.
*G02B 21/02* (2006.01)

(52) U.S. Cl.
CPC ...................................... *G02B 21/02* (2013.01)

(58) Field of Classification Search
CPC ...... G02B 21/00; G02B 21/02; G02B 21/025; G02B 21/04; G02B 27/0037
USPC .................................................. 359/656–661
See application file for complete search history.

(56) References Cited

U.S. PATENT DOCUMENTS

| 5,631,779 A | 5/1997 | Kashima |
| 5,748,372 A | 5/1998 | Kitagawa |
| 2010/0172034 A1* | 7/2010 | Yoshida ........................ 359/791 |

FOREIGN PATENT DOCUMENTS

| JP | A 6-331898 | 12/1994 |
| JP | A 8-286113 | 11/1996 |
| JP | A 2004-530937 | 10/2004 |
| JP | A 2010-066445 | 3/2010 |
| WO | WO 2009/041546 A1 | 4/2009 |

OTHER PUBLICATIONS

Jul. 12, 2011 Search Report issued in International Patent Application No. PCT/JP2011/063477 (with translation).
Feb. 14, 2014 Office Action issued in Japanese Patent Application No. 2012-520435 (with translation).
Jun. 5, 2014 Office Action issued in Japanese Patent Application No. 2012-520435 (with translation).

(Continued)

*Primary Examiner* — Darryl J Collins
*Assistant Examiner* — Journey Sumlar
(74) *Attorney, Agent, or Firm* — Oliff PLC

(57) ABSTRACT

Provided is a microscope objective lens that sufficiently corrects on-axis and off-axis chromatic aberrations and that has a long working distance. A microscope objective lens OL includes, in order from an object side, a first lens group G1 with positive refractive power and a second lens group G2 with negative refractive power. The first lens group G1 of the microscope objective lens OL includes a diffractive optical element GD including a diffractive optical surface D, and the diffractive optical element GD is arranged at a position closer to the image than a section where a diameter of a light flux passing through the first lens group G1 is the largest.

16 Claims, 19 Drawing Sheets

(56) References Cited

OTHER PUBLICATIONS

Dec. 19, 2012 International Preliminary Report on Patentability issued in International Patent Application No. PCT/JP2011/063477 (with translation).

May 19, 2015 Office Action issued in Chinese Patent Application No. 201180029629.3.
Feb. 6, 2016 Office Action issued in Chinese Patent Application No. 201180029629.3.

* cited by examiner

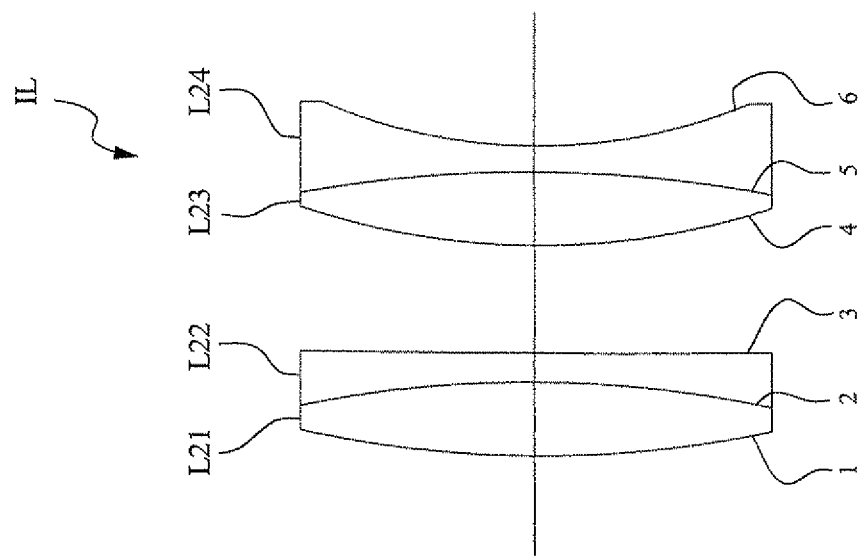

MICROSCOPE OBJECTIVE LENS

This is a Continuation of Application No. PCT/JP2011/063477 filed Jun. 13, 2011, which claims the benefit of Japanese Patent Application No. 2010-136728 filed Jun. 16, 2010 and Japanese Patent Application No. 2010-136729 filed Jun. 16, 2010. The disclosure of the prior applications is hereby incorporated by reference herein in its entirety.

TECHNICAL FIELD

The present invention relates to a microscope objective lens.

BACKGROUND ART

In microscopic observation, a microscope objective lens with as long working distance as possible is desired to facilitate handling of a sample. However, a focal length of a lens group arranged on an object side needs to be long to secure a long working distance. Furthermore, when the focal length of the lens group is taken into account, a space for the arrangement of the lenses is limited, and correction of aberrations, particularly high-order spherical aberration and chromatic aberration, becomes difficult. Therefore, a lens system using a diffractive optical element (DOE) is proposed (for example, see Patent Literature 1). The use of the diffractive optical element allows advanced correction of the chromatic aberration, and necessary correction by the lenses is therefore the correction of the spherical aberration.

CITATION LIST

Patent Literature

Patent Literature 1: Japanese Patent Laid-Open No. 6-331898

SUMMARY OF INVENTION

Technical Problem

However, on-axis and off-axis chromatic aberrations need to be balanced in the lens system using the diffractive optical element, and the arrangement of the diffractive optical element needs to be devised.

The present invention has been made in view of the problem, and an object of the present invention is to provide a microscope objective lens that sufficiently corrects on-axis and off-axis chromatic aberrations and that has a long working distance.

Solution to Problem

To solve the problem, a first present invention provides a microscope objective lens including, in order from an object side: a first lens group with positive refractive power; and a second lens group with negative refractive power, wherein the first lens group includes a diffractive optical element including a diffractive optical surface, the diffractive optical element is arranged at a position closer to the image than a position where a diameter of a light flux passing through the first lens group is the largest, and conditions of the following expressions are satisfied, in which a maximum diameter of the light flux passing through the first lens group is defined as $\phi max$, a maximum diameter of the light flux passing through the diffractive optical surface is defined as $\phi DOE$, a focal length of the second lens group is defined as $f2$ and a focal length of an entire system is defined as $f$:

$$\phi DOE/\phi max < 0.76$$

$$0.65 < (-f2)/f < 2.0.$$

It is preferable that in the microscope objective lens, the first lens group includes a lens component with positive refractive power arranged closest to an object, and a condition of the following expression is satisfied, in which a distance on an optical axis from the object to an apex of a lens surface closest to the object of the first lens group is defined as $d0$, and a distance on the optical axis from the object to an apex of a lens surface closest to an image is defined as L:

$$0.1 < d0/L < 0.6.$$

It is preferable that in the microscope objective lens, a condition of the following expressions is satisfied, in which a focal length of the lens component closest to the object of the first lens group is defined as $f11$:

$$1.2 < f11/f < 19.0.$$

It is preferable that in the microscope objective lens, a condition of the following expression is satisfied, in which a focal length of the first lens group is defined as $f1$:

$$0.5 \le f1/f \le 3.5.$$

It is preferable that in the microscope objective lens, a lens surface closest to the image of the second lens group is arranged to have a concave surface facing the image side.

It is preferable that in the microscope objective lens, a position of an intersection of a principal ray and an optical axis is closer to the object than the lens surface closest to the image of the second lens group.

It is preferable that in the microscope objective lens, the first lens group includes at least one cemented positive lense.

It is preferable that in the at least one cemented positive lense in the first lens group of the microscope objective lens, when an absolute value of a difference between an Abbe number of a medium of a positive lens element and an Abbe number of a medium of a negative lens element included in the cemented positive lens is defined as $\Delta v_{d1}$, at least one of the absolute values of the differences satisfies a condition of the following expression:

$$\Delta v_{d1} > 40.$$

It is preferable that in the microscope objective lens, the second lens group includes at least one cemented negative lenses.

It is preferable that in the at least one cemented negative lense of the second lens group of the microscope objective lens, when an absolute value of a difference between an Abbe number of a medium of a positive lens element and an Abbe number of a medium of a negative lens element included in the cemented negative lens is defined as $\Delta v_{d2}$, at least one of the absolute values of the differences satisfies a condition of the following expression:

$$\Delta v_{d2} > 30.$$

It is preferable that in the microscope objective lens, a condition of the following expression is satisfied, in which a marginal ray height of the lens surface closest to the object of the first lens group is defined as H, and an on-axis lens thickness of the lens component closest to the object of the first lens group is defined as $d11$:

$$2 < H/d11 < 3.6.$$

It is preferable that in the microscope objective lens, the lens surface closest to the object of the first lens group is arranged to have a concave surface facing the object side.

It is preferable that in the microscope objective lens, when a refractive index relative to a d line of a medium of a lens arranged closest to the object of the first lens group is defined as n1, a radius of curvature of the lens surface closest to the object of the lens is defined as r, power φ of the lens surface closest to the object of the lens is defined by the following expression $$\phi = (n1-1)/r,$$

and an effective radius of the lens surface closest to the object of the lens arranged closest to the object is defined as H1, a condition of the following expression is satisfied:

$$0.05 \le |\phi \times H1| \le 0.35.$$

A second present invention provides a microscope objective lens including, in order from an object side: a first lens group with positive refractive power; and a second lens group with negative refractive power, wherein the first lens group includes a lens component with positive refractive power arranged closest to an object and a diffractive optical element including a diffractive optical surface, the diffractive optical element is arranged at a location closer to the image than a position where a diameter of a light flux passing through the first lens group is the largest, and conditions of the following expressions are satisfied, in which a distance on an optical axis from the object to an apex of a lens surface closest to the object of the first lens group is defined as d0, a distance on the optical axis from the object to an apex of a lens surface closest to an image is defined as L, a maximum diameter of the light flux passing through the first lens group is defined as φmax, and a maximum diameter of the light flux passing through the diffractive optical surface is defined as φDOE:

$$0.3 < d0/L < 0.6$$

$$\phi DOE/\phi max < 0.76.$$

A third present invention provides a microscope objective lens including, in order from an object side: a first lens group with positive refractive power; and a second lens group with negative refractive power, wherein the first lens group includes a lens component with positive refractive power arranged closest to an object and a diffractive optical element including a diffractive optical surface, the diffractive optical element is arranged at a location closer to the image than a position where a diameter of a light flux passing through the first lens group is the largest, and conditions of the following expressions are satisfied, in which a focal length of the lens component closest to the object of the first lens group is defined as f11, a focal length of an entire system is defined as f, a maximum diameter of the light flux passing through the first lens group is defined as φmax, and a maximum diameter of the light flux passing through the diffractive optical surface is defined as φDOE:

$$2 < f11/f < 10.0$$

$$\phi DOE/\phi max < 0.5.$$

A fourth present invention provides a microscope objective lens including, in order from an object side: a first lens group with positive refractive power; and a second lens group with negative refractive power, wherein the first lens group includes a lens component with positive refractive power arranged closest to an object and a diffractive optical element including a diffractive optical surface with positive refractive power, the diffractive optical element is arranged at a location closer to the image than a position where a diameter of a light flux passing through the first lens group is the largest, and conditions of the following expressions are satisfied, in which a focal length of the lens component closest to the object of the first lens group is defined as f11, a focal length of an entire system is defined as f, a maximum diameter of the light flux passing through the first lens group is defined as φmax, and a maximum diameter of the light flux passing through the diffractive optical surface is defined as φDOE:

$$1.2 < f11/f < 6.0 \text{ or } 15.0 < f11/f < 19.0$$

$$\phi DOE/\phi max < 0.76.$$

A fifth present invention provides a microscope objective lens including, in order from an object side: a first lens group with positive refractive power; and a second lens group with negative refractive power, wherein the first lens group includes a diffractive optical element including a diffractive optical surface with positive refractive power, the diffractive optical element is arranged at a location closer to the image than a position where a diameter of a light flux passing through the first lens group is the largest, and conditions of the following expressions are satisfied, in which a focal length of the first lens group is defined as f1, a focal length of an entire system is defined as f, a maximum diameter of the light flux passing through the first lens group is defined as φmax, and a maximum diameter of the light flux passing through the diffractive optical surface is defined as φDOE:

$$0.5 \le f1/f \le 3.0$$

$$\phi DOE/\phi max < 0.76.$$

Advantageous Effect of Invention

If the microscope objective lens according to the present invention is formed as described above, a microscope objective lens that sufficiently corrects on-axis and off-axis chromatic aberrations and that has a long working distance can be provided.

BRIEF DESCRIPTION OF DRAWINGS

FIG. 19 is a lens configuration diagram of an imaging lens used with the microscope objective lens.

DESCRIPTION OF EMBODIMENTS

Figure 1:
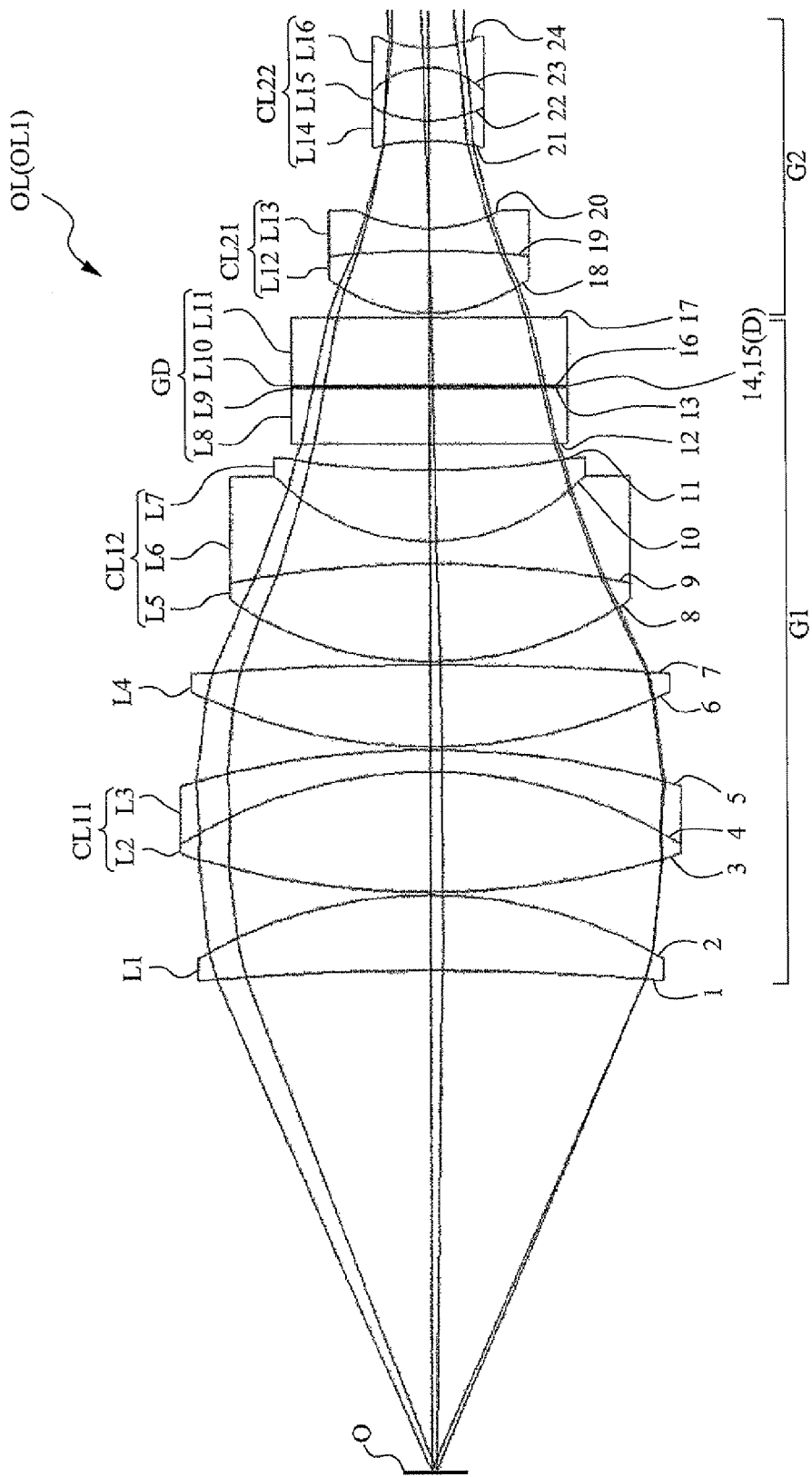
FIG. 1 is a lens configuration diagram of a microscope objective lens according to a first example.

Hereinafter, preferred embodiments of the present invention will be described with reference to the drawings. A configuration of a microscope objective lens according to the present embodiments will be described with reference to FIG. 1. A microscope objective lens OL includes a first lens group with positive refractive power and a second lens group with negative refractive power in order from an object side.

In the microscope objective lens OL, a first lens group G1 is a lens group for collecting a divergent light flux from an object to form a convergent light flux. Therefore, the microscope objective lens OL includes a lens component with positive refractive power closest to the objective side (for example, positive meniscus lens L1 in FIG. 1, hereinafter called "first lens component L1"). The first lens group G1 of the microscope objective lens OL includes a diffractive optical element GD for correcting a chromatic aberration. The diffractive optical element GD is arranged at a location closer to the image than a position where the diameter of the light flux passing through the first lens group G1 is the largest. The first lens group G1 includes at least one cemented positive lens for correcting the chromatic aberration, and at least one of the cemented positive lenses is arranged on the object side of the diffractive optical element GD. The first lens component L1 may include a single lens or may include a cemented lens.

The diffractive optical element GD includes a diffractive optical surface D with a concentrically formed grating structure including several to several hundred fine grooves or slits per 1 mm and has a property of diffracting light incident on the diffractive optical surface D in a direction determined by a grating pitch (spacing of diffraction grating grooves) and a wavelength of the incident light. The diffractive optical element GD (diffractive optical surface D) has a negative dispersion value (Abbe number=−3.453 in the embodiments described later). Dispersion is large, and anomalous dispersibility (partial dispersion ratio (ng−nF)/(nF−nC)=0.2956 in the embodiments described later) is high. Therefore, the diffractive optical element GD has powerful chromatic aberration correction capability. Although the Abbe number of an optical glass is usually about 30 to 80, the Abbe number of the diffractive optical element is a negative value as described above. In other words, the diffractive optical surface D of the diffractive optical element DG has dispersion characteristics opposite of those of the normal glass (refractive optical element). A refractive index decreases with a decrease in the wavelength of the light, and light with a longer wavelength is bent more. Therefore, a large achromatic effect can be attained by a combination with the normal refractive optical element. As a result, the use of the diffractive optical element GD allows favorable correction of chromatic aberration that cannot be attained by the normal optical glass.

The diffractive optical element GD according to the present embodiments is a so-called "contact multi-layered diffractive optical element", in which two diffractive element factors (for example, optical members L7 and L8 in FIG. 1) made of different optical materials are bonded, and diffraction grating grooves are arranged on the bonded surface to form the diffractive optical surface D. Therefore, the diffractive optical element GD can increase the diffraction efficiency in a wide wavelength region including a g line to a C line. As a result, the microscope objective lens OL according to the present embodiments can be used in a wide wavelength region. When primary diffracted light is used in a transmission-type diffractive optical element, the diffraction efficiency indicates a ratio η of incident intensity I0 and intensity I1 of the primary diffracted light (=I1/I0×100 [%]).

The contact multi-layered diffractive optical element can simplify the manufacturing process compared to a so-called separate multi-layered diffractive optical element including two diffractive element factors with diffraction grating grooves closely arranged so that the diffraction grating grooves face each other. Therefore, the contact multi-layered diffractive optical element has advantages of excellent mass production efficiency and excellent diffraction efficiency relative to an incident angle of a ray. As a result, the microscope objective lens OL according to the present embodiments using the contact multi-layered diffractive optical element facilitates the manufacturing and improves the diffraction efficiency.

It is desirable that the microscope objective lens OL satisfies the following conditional expression (1), wherein the maximum diameter of the light flux passing through the first lens group G1 is defined as φmax, and the maximum diameter of the light flux passing through the diffractive optical surface D (15th surface in FIG. 1) of the diffractive optical element GD is defined as φDOE.

$$\phi DOE/\phi max < 0.76 \quad (1)$$

Conditional expression (1) indicates a condition of the maximum effective diameter of the ray passing through the diffractive optical surface D of the diffractive optical element GD. If the diffractive optical element GD (diffractive optical surface D) is arranged at a part with a large effective diameter, high-order spherical aberration and coma aberration occur. Therefore, conditional expression (1) needs to be satisfied. An upper limit of conditional expression (1) can be set to 0.5 to further attain the advantageous effect of the present specification.

A second lens group G2 is a lens group that converts a convergent light flux exited from the first lens group G1 to a substantially parallel light flux. The second lens group G2 includes at least one cemented negative lens (for example, cemented negative lens CL21 in FIG. 1) for correcting the chromatic aberration. A lens surface closest to the image of the second lens group G2 (for example, 24th surface in FIG. 1) is arranged to have a concave surface facing the image side. The light flux incident on the second lens group G2 is a convergent light flux because the first lens group G1 has positive refractive power. The second lens group G2 receives the convergent light flux, and it is important to convert the convergent light flux to a parallel light flux while suppressing the occurrence of the spherical aberration and the coma aberration. Therefore, the lens surface closest to the image of the second lens group G2 is a surface that bears a large part of the negative refractive power of the second lens group G2. The formation of the surface by a concave surface on the image side can reduce the incident angle of the convergent ray relative to the final surface. Particularly, the occurrence of the high-order coma aberration and the like can be accurately suppressed.

It is desirable that the microscope objective lens OL satisfies the following conditional expression (2), wherein the focal length of the second lens group G2 is defined as f2, and the focal length of the entire system of the microscope objective lens OL is defined as f.

$$0.65<(-f2)/f<2.0 \quad (2)$$

Conditional expression (2) defines the focal length of the second lens group G2. If the focal length f2 of the second lens groups G2 is reduced below the lower limit of conditional expression (2), the curvature of each lens surface of the second lens group G2 increases too much. The high-order coma aberration (coma aberration of color) occurs, and the correction becomes difficult. On the other hand, if the focal length f2 of the second lens group G2 is increased above the upper limit of conditional expression (2), the refractive power of the second lens group G2 is reduced. Therefore, the correction of the curvature of field and the coma aberration becomes insufficient.

In the microscope objective lens OL, if the position where the principal ray and the optical axis intersect is closer to the object than the lens surface closest to the image of the second lens group G2 (for example, 24th surface of FIG. 1), the second lens group G2 can favorably correct the curvature of field and the coma aberration.

Note that, in the microscope lens OL of FIG. 1, the principal ray of the light flux emitted from the off-axis object point is limited by limiting the ray emitted in a direction farthest from the optical axis in the light flux emitted from the off-axis object by a intersection of the ray of the maximum numerical aperture (NA) emitted from the on-axis object point and an appropriate lens surface in the first lens group G1 (for example, surface of the lens L1 on the image side in FIG. 1 (2nd surface)) and by limiting the ray emitted in a direction closest to the optical axis by an intersection of the ray of the maximum numerical aperture emitted from the on-axis object point and an appropriate lens surface in the second lens group G2 (for example, surface of the lens L14 on the object side in FIG. 1 (21st surface)) to determine the off-axis light flux to determine the center ray of the off-axis light flux.

It is desirable that the microscope objective lens OL satisfies the following conditional expression (3), wherein a distance on the optical axis from an object O (object-side focal surface of the microscope objective lens OL) to the lens surface closest to the object of the first lens group G1 (for example, 1st surface in FIG. 1) is defined as d0, and a distance on the optical axis from the object O to the lens surface closest to the image of the entire system (for example, 24th surface in FIG. 1) is defined as L.

$$0.1<d0/L<0.6 \quad (3)$$

Conditional expression (3) defines the working distance of the microscope objective lens OL according to the present embodiments. If the value is below the lower limit of conditional expression (3), the distance between the microscope objective lens OL and the object O is too narrow. The operability of the microscope apparatus including the microscope objective lens OL is degraded, and this is not preferable. The lower limit of conditional expression (3) can be set to 0.3 to further attain the advantageous effect of the present specification. On the other hand, if the value is above the upper limit of conditional expression (3), the space of the lens section (that is, space from the surface closest to the object of the microscope objective lens OL to the surface closest to the image) becomes insufficient. The number or thickness of the lenses that can be arranged is limited, and it is difficult to correct the spherical aberration and the chromatic aberration.

It is desirable that the microscope objective lens OL satisfies the following conditional expression (4), wherein the focal length of the first lens component L1 as a lens component closest to the object of the first lens group G1 is defined as f11, and the focal length of the entire system of the microscope objective lens OL is defined as f.

$$1.2<f11/f<19.0 \quad (4)$$

Conditional expression (4) defines the focal length of the first lens component L1 included in the first lens group G1. If the focal length f11 of the first lens component L1 is reduced below the lower limit of conditional expression (4), a high-order spherical aberration occurs, and it is difficult to secure the working distance. The lower limit of conditional expression (4) can be set to 2 to further attain the advantageous effect of the present specification. On the other hand, if the focal length f11 of the first lens component L1 is increased above the upper limit of conditional expression (4), it is easy to secure the working distance. However, the diameter of the light flux passing through the first lens component L1 is increased, and subsequent lens components cannot effectively convert the light flux to convergent light. The load on the second lens group G2 increases, and favorable correction of the spherical aberration and the coma aberration becomes difficult. The upper limit of conditional expression (4) can be set to 10.0 to further attain the advantageous effect of the present specification. The microscope objective lens OL can further attain the advantageous effect of the present specification by satisfying the following conditional expression (4') in place of conditional expression (4).

$$1.2<f11/f<6.0 \text{ or } 15.0<f11<f<19.0 \quad (4')$$

It is desirable that the microscope objective lens OL satisfies the following conditional expression (5), wherein the focal length of the first lens group G1 is defined as f1, and the focal length of the entire system of the microscope objective lens OL is defined as f.

$$0.5 \le f1/f \le 3.5 \quad (5)$$

Conditional expression (5) denotes a condition for correcting the aberration while securing a sufficient working distance. If the value is below the lower limit of conditional expression (5), the focal length f1 of the first lens group G1 is short compared to the focal length f of the entire system, and it is difficult to correct the high-order spherical aberration and coma aberration. On the other hand, if the value is above the upper limit of conditional expression (5), the focal length f1 of the first lens group G1 is long compared to the focal length f of the entire system. The convergence of the ray is not sufficient, and the total length becomes long. It is difficult to secure the sufficient working distance, and it is also difficult to secure the image surface flatness. The upper limit of conditional expression (5) can be set to 3.0 to further attain the advantageous effect of the present specification.

In the microscope objective lens OL, it is desirable that at least one of the cemented positive lenses included in the first lens group G1 satisfies the following conditional expression (6), wherein the absolute value of the difference between the Abbe number of the medium of the positive lens element and the Abbe number of the medium of the negative lens element of the cemented positive lens is defined as $\Delta v_{d1}$. If three or more lenses are bonded in the cemented positive lens, it is desirable that one of the absolute values of the differences satisfies conditional expression (6).

$$\Delta v_{d1} > 40 \quad (6)$$

Conditional expression (6) is related to correction of the longitudinal chromatic aberration and the chromatic aberration of magnification. If the value is out of the range of conditional expression (6), the absolute value of the difference between the Abbe numbers of the positive lens and the negative lens included in the cemented positive lens that acts as an achromatic lens component is reduced, and the radius of curvature of the bonded surface needs to be reduced to attain the same achromatic effect. As a result, even if the achromatic aberration on the axis can be corrected, high-order aberrations of other aberrations occur, and the correction becomes difficult.

In the microscope objective lens OL, it is desirable that at least one of the cemented negative lenses included in the second lens group G2 satisfies the following conditional expression (7), wherein the absolute value of the difference between the Abbe number of the medium of the positive lens element and the Abbe number of the medium of the negative lens element included in the cemented negative lens is defined as $\Delta v_{d2}$. If three or more lenses are bonded in the cemented negative lens, it is desirable that one of the absolute values of the differences satisfies conditional expression (7).

$$\Delta v_{d2} > 30 \quad (7)$$

Conditional expression (7) is related to correction of the longitudinal chromatic aberration, particularly, correction of the chromatic aberration of magnification. If the value is out of the range of conditional expression (7), the radius of curvature of the bonded surface of the cemented lens needs to be reduced, and the correction of the curvature of field and the coma aberration becomes difficult.

It is desirable that the microscope objective lens OL satisfies the following conditional expression (8), wherein a marginal ray height of the lens surface closest to the object of the first lens group G1 (1st surface) is defined as H, and an on-axis lens thickness of the first lens component L1 as a lens component closest to the object of the first lens group G1 is defined as d11.

$$2 < H/d11 < 3.6 \quad (8)$$

Conditional expression (8) is an expression that defines thickness of the first lens component L1 (on-axis lens thickness). To increase the working distance, the thickness of the first lens component L1 of the first lens group G1 cannot be increased much, because the space for arranging the lenses would be limited. If the value is above the upper limit of conditional expression (8), the incident height of the marginal ray that enters the first lens component L1 is increased. Therefore, high-order spherical aberrations (spherical aberrations of color) occur, and correction of the aberrations by other lens components of the first lens group G1 and lens components of the second lens group G2 becomes difficult. On the other hand, if the value is below the lower limit of conditional expression (8), the thickness of the first lens component L1 becomes too thick. The space for arranging the lens components (including the diffractive optical element GD and the second lens group G2) on the image side of the first lens component L1 is limited. Therefore, the degree of freedom in designing the lens components is lost, and the aberration correction cannot be effectively performed.

It is preferable that the microscope objective lens OL satisfies the following conditional expression (9), wherein the refractive index relative to the d line of the medium of the lens arranged closest to the object (positive meniscus lens L1 in FIG. 1) is defined as n1. The power of the lens surface closest to the object of the lens is defined as $\phi$, in which the radius of curvature of the lens surface closest to the object of the lens (1st surface) is defined as r. The effective radius of the lens surface closest to the object of the lens arranged closest to the object is defined as H1.

$$0.05 \le |\phi \times H1| \le 0.35 \quad (9)$$

Where $\phi = (n1-1)/r$

Note that, in the microscope objective lens OL of FIG. 1, the effective radius H1 is determined by the outermost ray of the light flux determined by limiting the ray emitted in a direction farthest from the optical axis among the ray of the maximum numerical aperture emitted from the on-axis object point and the light flux emitted from the off-axis object point by the intersection of the ray of the maximum numerical aperture emitted from the on-axis object point and an appropriate lens surface in the first lens group G1 (for example, surface on the image side of the lens L1 in FIG. 1 (2nd surface)) and by limiting the ray emitted in a direction closest to the optical axis by the intersection of the ray of the maximum numerical aperture emitted from the on-axis object point and an appropriate lens surface of the second lens group G2 (for example, surface on the object side of the lens L14 in FIG. 1 (21st surface)).

Conditional expression (9) defines refractive power of the surface with negative refractive power of the first lens group G1. If the value is below the lower limit of conditional expression (9), correction of the Petzval sum is difficult, and it is difficult to secure the image surface flatness up to a high angle of view. Furthermore, a sufficiently long working distance cannot be secured. On the other hand, if the value is above the upper value of conditional expression (9), the spherical aberration and the coma aberration occur, and correction by a subsequent lens group is difficult.

EXAMPLES

Hereinafter, nine examples of the microscope objective lens OL according to the present embodiments will be illustrated. In each example, the phase difference of the diffractive optical surface D formed on the diffractive optical element GD is calculated by an ultra-high index method executed using a normal refractive index and an aspheric expression (a) described later. A certain equivalence relationship between an aspheric shape and a grating pitch of the diffractive optical surface is used in the ultra-high index method. In the present examples, the diffractive optical surface D is indicated by data of the ultra-high index method, that is, the aspheric expression (a) described later and coefficients of the expression. In the present examples, a d line, a C line, an F line, and a g line are selected as targets of calculation of the aberration characteristics. Wavelengths of the d line, the C line, the F line, and the g line used in the present examples and values of the refractive index used for the calculation of the ultra-high index method set for the spectral lines are illustrated in the following table 1.

TABLE 1

| | Wavelength | Refractive Index (based on ultra-high index method) |
|---|---|---|
| d line | 587.562 nm | 10001.0000 |
| C line | 656.273 nm | 11170.4255 |

TABLE 1-continued

|  | Wavelength | Refractive Index (based on ultra-high index method) |
|---|---|---|
| F line | 486.133 nm | 8274.7311 |
| g line | 435.835 nm | 7418.6853 |

In the examples, the aspheric surface is expressed by the following expression (a), wherein the height in the direction perpendicular to the optical axis is defined as y, the distance (amount of sag) along the optical axis from the tangent plane of the apex of each aspheric surface at the height y to each aspheric surface is defined as S(y), the radius of curvature (apex curvature radius) of the reference spherical surface is defined as r, the conic constant is defined as κ, and the aspheric coefficient of n-th order is defined as An. In the following examples, "E-n" denotes "×10$^{-n}$".

$$S(y)=(y2/r)/\{1+(1-\kappa \times y2/r2)1/2\}+A2 \times y^2 \times A4 \times y^4 \times A6 \times y^6 \times A8 \times y^8 \times A10 \times y^{10}$$ (a)

In each example, a * mark is attached to the right side of the surface number in the table for a lens surface provided with the diffractive optical surface, and the aspheric expression (a) indicates parameters of the performance of the diffractive optical surface.

Microscope objective lenses OL1 to OL9 in the following examples are infinity correction type lenses. The lenses have configurations shown in FIG. 19, and the lenses are used along with an imaging lens IL including parameters shown in table 2. In table 2, a first column m denotes the number of each optical surface from the object side, a second column r denotes the radius of curvature of each optical surface, a third column d denotes the distance (surface spacing) on the optical axis from each optical surface to the next optical surface, a fourth column nd denotes the refractive index relative to the d line, and a fifth column vd denotes the Abbe number. A refractive index 1.00000 of the air is omitted here. The description of the parameter table also applies to the following examples.

TABLE 2

| m | r | d | nd | vd |
|---|---|---|---|---|
| 1 | 75.043 | 5.10 | 1.62280 | 57.0 |
| 2 | −75.043 | 2.00 | 1.74950 | 35.2 |
| 3 | 1600.580 | 7.50 |  |  |
| 4 | 50.256 | 5.10 | 1.66755 | 42.0 |
| 5 | −84.541 | 1.80 | 1.61266 | 44.4 |
| 6 | 36.911 |  |  |  |

The imaging lens IL includes, in order from the object side: a cemented lens formed by bonding a biconvex lens L21 and a biconcave lens L22; and a cemented lens formed by bonding a biconvex lens L23 and a biconcave lens L24.

First Example

FIG. 1 used in the description above illustrates a microscope objective lens OL1 according to a first example. The microscope objective lens OL1 includes, in order from the object side, a first lens group G1 with positive refractive power and a second lens group G2 with negative refractive power. The first lens group G1 includes, in order from the object side: a positive meniscus lens L1 with the concave surface facing the object side; a cemented positive lens CL11 formed by bonding a biconvex lens L2 and a negative meniscus lens L3 with the concave surface facing the object side; a biconvex lens L4; a cemented positive lens CL12 formed by bonding a biconvex lens L5, a biconcave lens L6, and a positive meniscus lens L7 with the convex surface facing the object side; and a diffractive optical element GD in a plate shape. The second lens group G2 includes, in order from the object side: a cemented negative lens CL21 formed by bonding a biconvex lens L12 and a biconcave lens L13; and a cemented negative lens CL22 formed by bonding a biconcave lens L14, a biconvex lens L15, and a biconcave lens L16. The surface closest to the image of the second lens group G2 (24th surface) is arranged to have a concave surface facing the image side. As described, the lens surfaces limiting the off-axis light flux that determines the off-axis principal ray and the effective diameter in the present first example are the surface of the positive meniscus lens L1 on the image side (2nd surface) and the surface of the biconcave lens L14 on the object side (21st surface).

In the diffractive optical element GD, a planar optical glass L8, two optical members L9 and L10 formed by different resin materials, and a planar optical glass L11 are bonded in this order, and diffraction grating grooves (diffractive optical surface D) are formed on the bonded surface of the optical members L9 and L10. Therefore, the diffractive optical element GD is a contact multi-layered diffractive optical element.

Table 3 shows parameters of the microscope objective lens OL1 according to the first embodiment illustrated in FIG. 1. In table 3, f denotes the focal length of the entire system, NA denotes the numerical aperture, β denotes the magnification, φmax denotes the maximum diameter of the light flux passing through the first lens group G1, φDOE denotes the maximum diameter of the light flux passing through the diffractive optical surface D of the diffractive optical element GD, d0 denotes the distance on the optical axis from the object O to the apex of the lens surface closest to the object of the first lens group G1 (1st surface of the first lens component L1), L denotes the distance on the optical axis from the object O to the apex of the lens surface closest to the image of the microscope objective lens OL (24th surface), f1 denotes the focal length of the first lens group G1, f11 denotes the focal length of the lens component closest to the object of the first lens group G1 (first lens component L1), f2 denotes the focal length of the second lens group G2, H denotes the marginal ray height of the lens surface closest to the object of the first lens group G1, d11 denotes the on-axis lens thickness of the first lens component L1 closest to the object of the first lens group G1, and H1 denotes the effective radius of the lens surface closest to the object of the first lens group G1 (1st surface). The numbers of the optical surfaces shown in the first column m (* on the right denotes the lens surface formed as a diffractive optical surface) correspond to the surface numbers 1 to 24 shown in FIG. 1. In the second column r, the radius of curvature 0.000 denotes a flat surface. In the case of the diffractive optical surface, the second column r indicates the radius of curvature of the spherical surface serving as a reference of a base aspheric surface, and data used for the ultra-high index method is indicated in the parameter table as aspheric surface data. Table 3 further indicates values corresponding to conditional expressions (1) to (9), that is, condition corresponding values. The description of the parameter table also applies to the following examples.

The units of the radius of curvature r, the surface spacing d, the focal length F of the entire system, and the other lengths described in all parameters below are generally "mm" if not otherwise specified. However, the optical system can attain similar optical performance even if the optical system is proportionately expanded or reduced. Therefore, the unit is not limited to "mm", and other appropriate units can also be used.

TABLE 3 f = 4
NA = 0.4
β = 50x
φmax = 21.08
φDOE = 10.52
d0 = 22.51
L = 63.88
f1 = 13.24
f11 = 35.5
f2 = −5.1
H = 9.66
d11 = 3.40
H1 = 9.66

| m | r | d | nd | vd |
|---|---|---|---|---|
| 1 | −120.028 | 3.40 | 1.69680 | 55.5 |
| 2 | −20.743 | 0.15 | | |
| 3 | 37.941 | 5.35 | 1.49782 | 82.5 |
| 4 | −21.400 | 1.00 | 1.72046 | 34.7 |
| 5 | −39.959 | 0.15 | | |
| 6 | 24.558 | 3.70 | 1.60300 | 65.5 |
| 7 | −143.315 | 0.15 | | |
| 8 | 16.120 | 4.35 | 1.49782 | 82.5 |
| 9 | −47.354 | 1.00 | 1.80440 | 39.6 |
| 10 | 9.766 | 3.20 | 1.49782 | 82.5 |
| 11 | 38.999 | 1.20 | | |
| 12 | 0.000 | 2.50 | 1.51680 | 64.1 |
| 13 | 0.000 | 0.06 | 1.52760 | 34.7 |
| 14 | 0.000 | 0.00 | 10001.00000 | −3.5 |
| 15* | 0.000 | 0.06 | 1.55690 | 50.2 |
| 16 | 0.000 | 3.00 | 1.51680 | 64.1 |
| 17 | 0.000 | 0.20 | | |
| 18 | 7.350 | 2.80 | 1.49782 | 82.5 |
| 19 | −42.071 | 1.00 | 1.80440 | 39.6 |
| 20 | 7.151 | 3.90 | | |
| 21 | −10.484 | 0.90 | 1.72916 | 54.7 |
| 22 | 5.488 | 2.40 | 1.74077 | 27.8 |
| 23 | −3.461 | 0.90 | 1.62374 | 47.0 |
| 24 | 5.396 | | | |

Diffractive Optical Surface Data

15th Surface  κ = 1.0000            A2 = −5.55556E−08
              A4 = −9.09401E−14     A6 = −3.06886E−12
              A8 = 1.72870E−15      A10 = 0.00000E+00

Condition Corresponding Values (1) φDOE/φmax = 0.499
(2) (−f2)/f = 1.275
(3) d0/L = 0.352
(4) f11/f = 8.875
(5) f1/f = 3.31
(6) $\Delta v_{d1}$ = 47.8
(7) $\Delta v_{d2}$ = 42.9
(8) H/d11 = 2.84
(9) |φ × H1| = 0.056

Among the condition corresponding values shown in table 3, $\Delta v_{d1}$ of conditional expression (6) denotes the absolute value of the difference between the Abbe numbers of the biconvex lens L2 and the negative meniscus lens L3 included in the cemented positive lens CL11, $\Delta v_{d2}$ of conditional expression (7) denotes the absolute value of the difference between the Abbe numbers of the biconvex lens L12 and the biconcave lens L13 included in the cemented negative lens CL21, d11 of conditional expression (8) denotes the on-axis lens thickness of the positive meniscus lens L1 (surface spacing of 1st surface), and φ of conditional expression (9) denotes the power of the 1st surface. In this way, it can be recognized that conditional expressions (1) to (9) are all satisfied in the first example.

Figure 2:
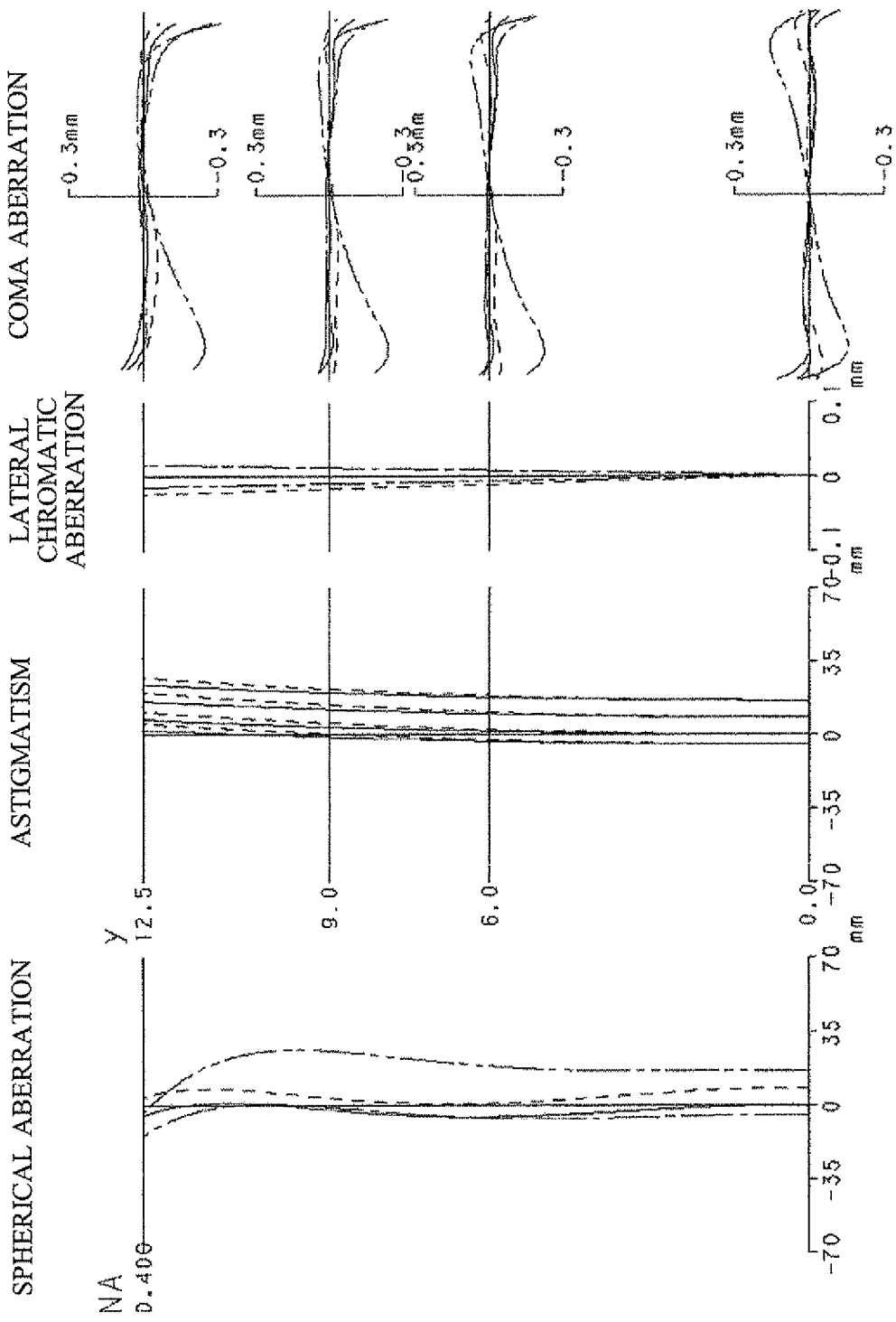
FIG. 2 is an aberrations diagram of the microscope objective lens according to the first example.

FIG. 2 shows aberration diagrams of the spherical aberration, the astigmatism, the lateral chromatic aberration, and the coma aberration from the rays of the d line, the C line, the F line, and the g line according to the first example. Among the aberration diagrams, the spherical aberration diagram indicates an amount of aberration from the numerical aperture NA, and the astigmatism diagram and the lateral chromatic aberration diagram indicates amounts of aberration from the image height Y. In the spherical aberration diagram, the lateral chromatic aberration diagram, and the coma aberration diagram, a solid indicates the d line, a dotted line indicates the C line, an alternate long and short dash line indicates the F line, and an alternate long and two short dashes line denotes the g line. In the astigmatism diagram, a solid line indicates a sagittal image surface relative to the ray of each wavelength, and a broken line indicates a meridional image surface relative to the ray of each wavelength. The description of the aberration diagrams applies to the following examples. The coma aberration diagrams of the present first example to a fifth example indicate amounts of aberrations when the image height Y is 12.5 mm, 9.0 mm, 6.0 mm, and 0 mm. As is clear from each aberration diagram shown in FIG. 2, it can be recognized that the aberrations are favorably corrected in the first example and excellent imaging performance is secured.

Second Example

A microscope objective lens OL2 shown in FIG. 3 will be described as a second embodiment. The microscope objective lens OL2 shown in FIG. 3 also includes, in order from the object side, a first lens group G1 with positive refractive power and a second lens group G2 with negative refractive power. The first lens group G1 includes, in order from the object side: a positive meniscus lens L1 with the concave surface facing the object side; a cemented positive lens CL11 formed by bonding a biconvex lens L2 and a negative meniscus lens L3 with the concave surface facing the object side; a biconvex lens L4; a cemented positive lens CL12 formed by bonding a biconvex lens L5, a biconcave lens L6, and a positive meniscus lens L7 with the convex surface facing the object side; a cemented positive lens CL13 formed by bonding a biconvex lens L8 and a biconcave lens L9; and a diffractive optical element GD in a plate shape. The second lens group G2 includes a cemented negative lens CL21 formed by bonding a biconcave lens L14, a biconvex lens L15, and a biconcave lens L16 in order from the object side. The surface closest to the image of the second lens group G2 (24th surface) is arranged to have a concave surface facing the image side. As described, the lens surfaces limiting the off-axis light flux that determines the off-axis principal ray and the effective diameter in the present second embodiment are the surface on the image side of the positive meniscus lens L1 (2nd surface) and the surface on the object side of the biconcave lens L14 (21st surface).

In the diffractive optical element GD, a planar optical glass L10, two optical members L11 and L12 formed by different resin materials, and a planar optical glass L13 are bonded in this order, and diffraction grating grooves (diffractive optical surface D) are formed on the bonded surface of the optical members L11 and L12. Therefore, the diffractive optical element GD is a contact multi-layered diffractive optical element.

Figure 3:
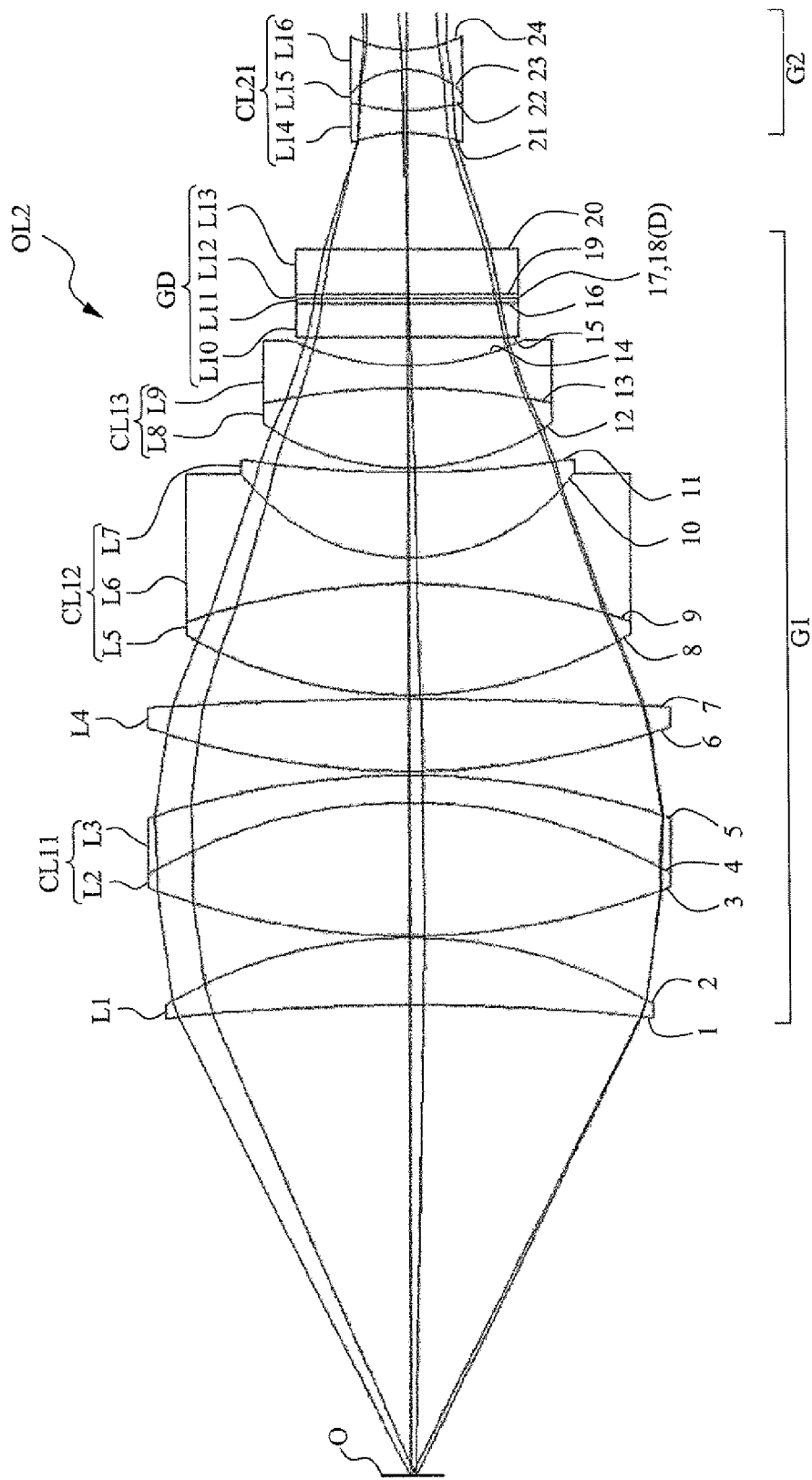
FIG. 3 is a lens configuration diagram of a microscope objective lens according to a second example.

Table 4 shows parameters of the microscope objective lens OL2 according to the second example shown in FIG. 3. The surface numbers shown in table 4 correspond to the surface numbers 1 to 24 shown in FIG. 3.

TABLE 4 f = 4
NA = 0.45
β = 50x
φmax = 22.97
φDOE = 8.39
d0 = 21.2
L = 63.95
f1 = 11.419
f11 = 35.8
f2 = −6.1
H = 10.43
d11 = 3.00
H1 = 10.43

| m | r | d | nd | νd |
|---|---|---|---|---|
| 1 | −106.833 | 3.00 | 1.75500 | 52.3 |
| 2 | −21.821 | 0.10 | | |
| 3 | 32.607 | 6.00 | 1.49782 | 82.5 |
| 4 | −23.000 | 1.20 | 1.74951 | 35.3 |
| 5 | −37.029 | 0.20 | | |
| 6 | 36.370 | 3.20 | 1.60300 | 65.5 |
| 7 | −194.801 | 0.20 | | |
| 8 | 19.708 | 5.00 | 1.49782 | 82.5 |
| 9 | −30.307 | 1.15 | 1.65412 | 39.7 |
| 10 | 9.380 | 3.80 | 1.49782 | 82.5 |
| 11 | 48.468 | 0.20 | | |
| 12 | 11.446 | 3.60 | 1.62280 | 57.0 |
| 13 | −32.624 | 1.00 | 1.90265 | 35.7 |
| 14 | 12.481 | 1.30 | | |
| 15 | 0.000 | 1.50 | 1.51680 | 64.1 |
| 16 | 0.000 | 0.20 | 1.52760 | 34.7 |
| 17 | 0.000 | 0.00 | 10001.00000 | −3.5 |
| 18* | 0.000 | 0.20 | 1.55690 | 50.2 |
| 19 | 0.000 | 2.00 | 1.51680 | 64.1 |
| 20 | 0.000 | 5.20 | | |
| 21 | −7.695 | 1.00 | 1.67003 | 47.3 |
| 22 | 8.600 | 1.80 | 1.75520 | 27.5 |
| 23 | −3.600 | 0.90 | 1.61720 | 54.0 |
| 24 | 5.471 | | | |

Diffractive Optical Surface Data

| 18th Surface | κ = 1.0000 | A2 = −9.09091E−08 |
|---|---|---|
| | A4 = −1.17370E−13 | A6 = −5.03090E−12 |
| | A8 = 4.70330E−14 | A10 = 0.00000E+00 |

Condition Corresponding Values (1) φDOE/φmax = 0.365
(2) (−f2)/f = 1.525
(3) d0/L = 0.332
(4) f11/f = 8.95
(5) f1/f = 2.855
(6) $\Delta\nu_{d1}$ = 47.2
(7) $\Delta\nu_{d2}$ = 26.5
(8) H/d11 = 3.48
(4) |φ × H1| = 0.074

Figure 4:
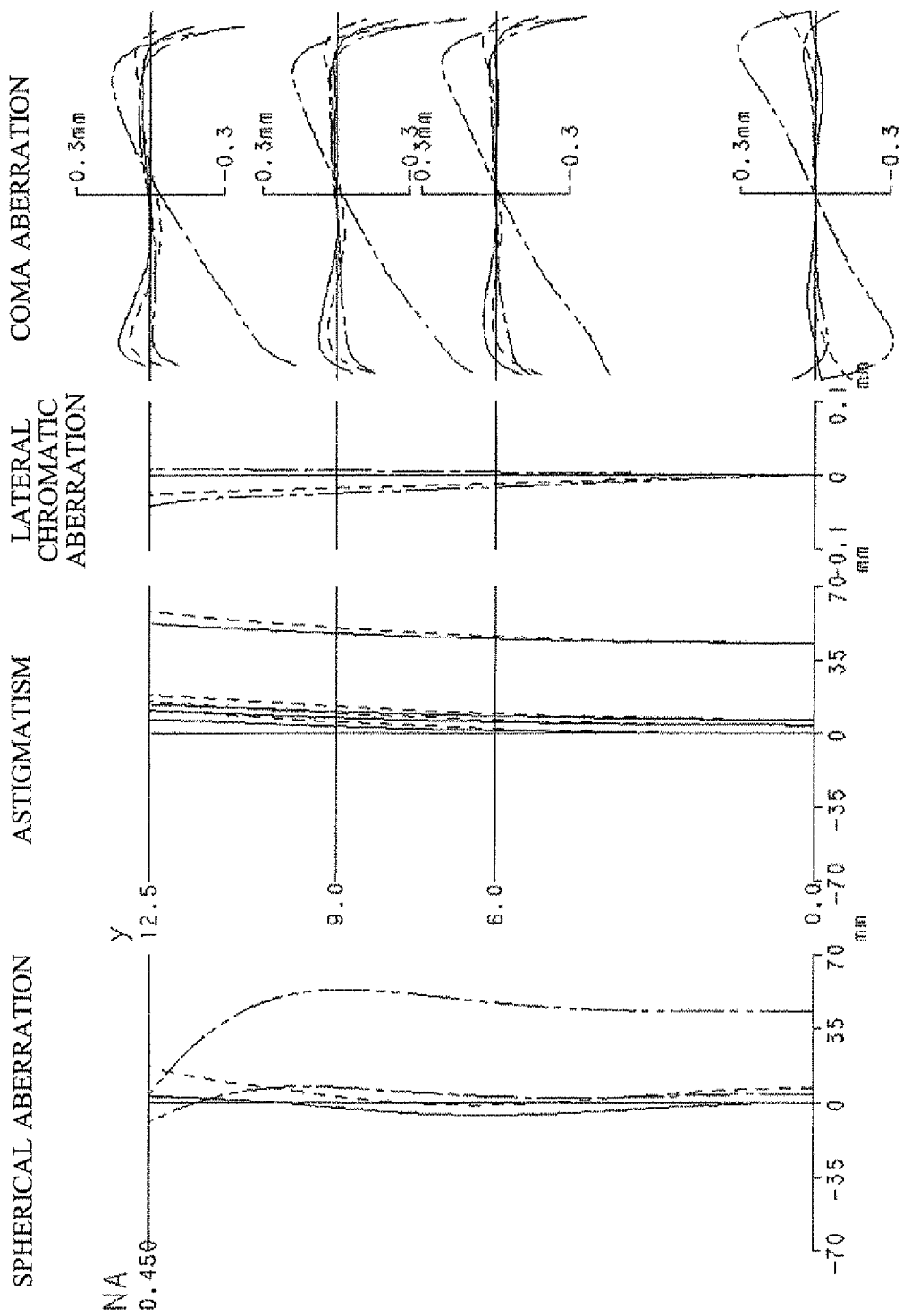
FIG. 4 is an aberrations diagram of the microscope objective lens according to the second example.

Among the condition corresponding values shown in table 4, $\Delta\nu_{d1}$ of conditional expression (6) denotes the absolute value of the difference between the Abbe numbers of the biconvex lens L2 and the negative meniscus lens L3 included in the cemented positive lens CL11, $\Delta\nu_{d2}$ of conditional expression (7) denotes the absolute value of the difference between the Abbe numbers of the biconvex lens L15 and the biconcave lens L16 included in the cemented negative lens CL21, d11 of conditional expression (8) denotes the on-axis lens thickness of the positive meniscus lens L1 (surface spacing of 1st surface), and φ of conditional expression (9) denotes the power of the 1st surface. In this way, it can be recognized that conditional expressions (1) to (6), (8), and (9) are satisfied in the second example. FIG. 4 shows aberration diagrams of the spherical aberration, the astigmatism, the lateral chromatic aberration, and the coma aberration from the rays of the d line, the C line, the F line, and the g line according to the second example. As is clear from each aberration diagram shown in FIG. 4, it can be recognized that the aberrations are favorably corrected in the second example and excellent imaging performance is secured.

Third Example

A microscope objective lens OL3 shown in FIG. 5 will be described as a third example. The microscope objective lens OL3 shown in FIG. 5 also includes, in order from the object side, the first lens group G1 with positive refractive power and the second lens group G2 with negative refractive power. The first lens group G1 includes, in order from the object side: a positive meniscus lens L1 with the concave surface facing the object side; a cemented lens CL11 formed by bonding a biconvex lens L2 and a negative meniscus lens L3 with the concave surface facing the object side; a cemented lens CL12 formed by bonding a biconvex lens L4, a biconcave lens L5, and a biconvex lens L6; a cemented lens CL13 formed by bonding a negative meniscus lens L7 with the convex surface facing the object side, a biconvex lens L8, and a biconcave lens L9; and a diffractive optical element GD in a plate shape. The second lens group G2 includes a cemented negative lens CL21 formed by bonding a positive meniscus lens L14 with the concave surface facing the object side and a biconcave lens L15 in order from the object side. The surface closest to the image of the second lens group G2 (22nd surface) is arranged to have a concave surface facing the image side. As described, the lens surfaces limiting the off-axis light flux that determines the off-axis principal ray and the effective diameter in the present third embodiment are the surface on the image side of the positive meniscus lens L1 (2nd surface) and the surface on the object side of the biconcave lens L14 (20th surface).

In the diffractive optical element GD, a planar optical glass L10, two optical members L11 and L12 formed by different resin materials, and a planar optical glass L13 are bonded in this order, and diffraction grating grooves (diffractive optical surface D) are formed on the bonded surface of the optical members L11 and L12. Therefore, the diffractive optical element GD is a contact multi-layered diffractive optical element.

Figure 5:
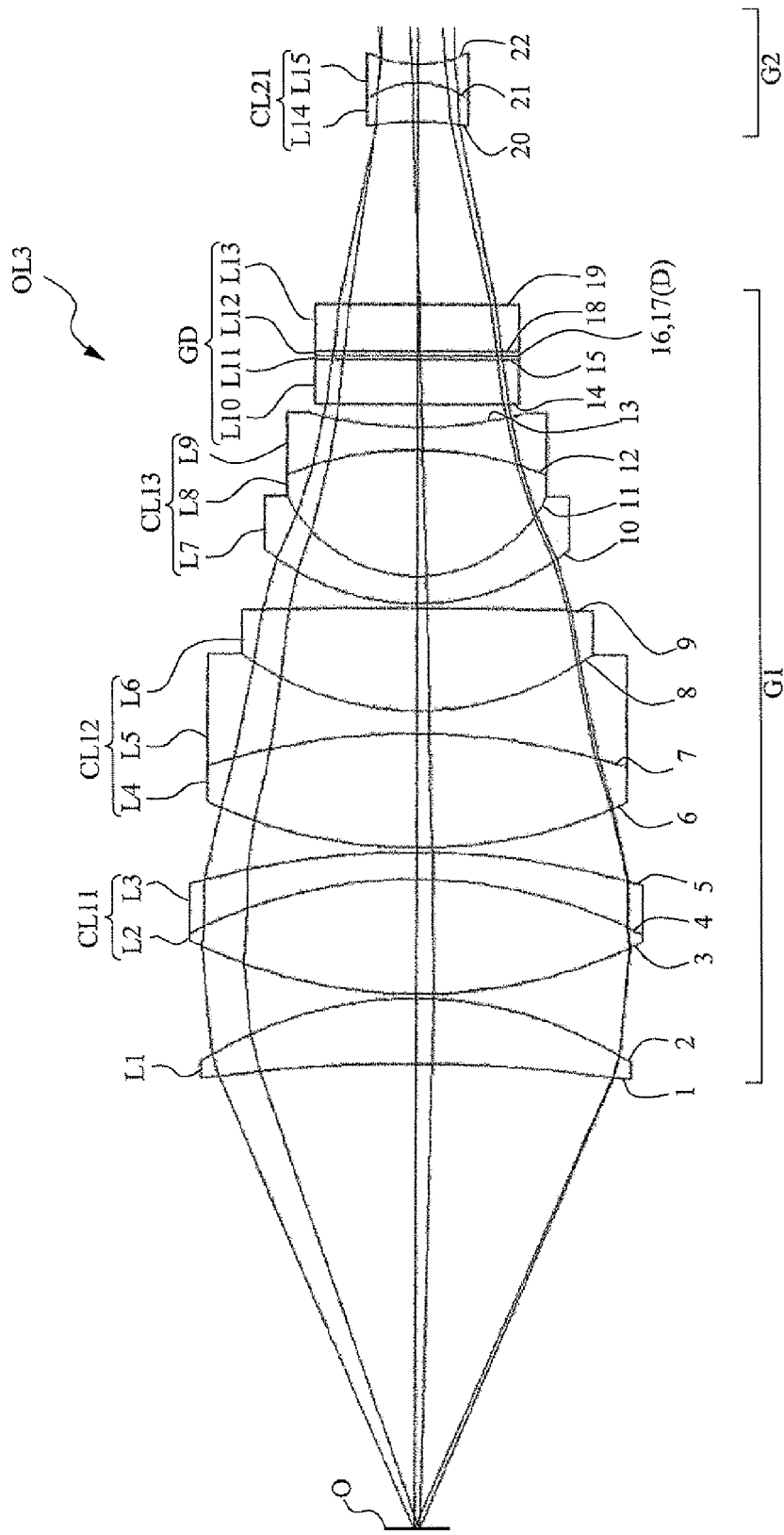
FIG. 5 is a lens configuration diagram of a microscope objective lens according to a third example.

Table 5 shows parameters of the microscope objective lens OL3 according to the third example shown in FIG. 5. The surface numbers shown in table 5 correspond to the surface numbers 1 to 22 shown in FIG. 5.

TABLE 5 f = 4
NA = 0.40
β = 50x
φmax = 18.93
φDOE = 7.53
d0 = 20.5
L = 64.3
f1 = 11.435
f11 = 31.5
f2 = −7.7
H = 8.7
d11 = 2.9
H1 = 8.7

| m | r | d | nd | νd |
|---|---|---|---|---|
| 1 | −65.565 | 2.90 | 1.72916 | 54.7 |
| 2 | −17.326 | 0.20 | | |
| 3 | 22.922 | 5.00 | 1.49782 | 82.5 |
| 4 | −22.000 | 1.20 | 1.74950 | 35.3 |
| 5 | −35.440 | 0.20 | | |

TABLE 5-continued

| | | | | |
|---|---|---|---|---|
| 6 | 22.360 | 5.00 | 1.49782 | 82.5 |
| 7 | −30.745 | 1.00 | 1.74400 | 44.8 |
| 8 | 13.432 | 4.50 | 1.60300 | 65.5 |
| 9 | −256.938 | 0.20 | | |
| 10 | 10.728 | 1.20 | 1.76684 | 46.8 |
| 11 | 6.480 | 5.50 | 1.49782 | 82.5 |
| 12 | −15.658 | 1.00 | 1.77250 | 49.6 |
| 13 | 18.157 | 1.00 | | |
| 14 | 0.000 | 2.00 | 1.51680 | 64.1 |
| 15 | 0.000 | 0.20 | 1.55690 | 50.2 |
| 16 | 0.000 | 0.00 | 10001.00000 | −3.5 |
| 17* | 0.000 | 0.20 | 1.52760 | 34.7 |
| 18 | 0.000 | 2.00 | 1.51680 | 64.1 |
| 19 | 0.000 | 8.00 | | |
| 20 | −12.850 | 1.70 | 1.80518 | 25.4 |
| 21 | −3.896 | 0.80 | 1.60300 | 65.5 |
| 22 | 5.227 | | | |

Diffractive Optical Surface Data

| 17th Surface | $\kappa = 1.0000$ | $A2 = -6.25000E-08$ |
|---|---|---|
| | $A4 = 3.43765E-11$ | $A6 = -5.81951E-19$ |
| | $A8 = -3.38276E-20$ | $A10 = 0.00000E+00$ |

Figure 6:
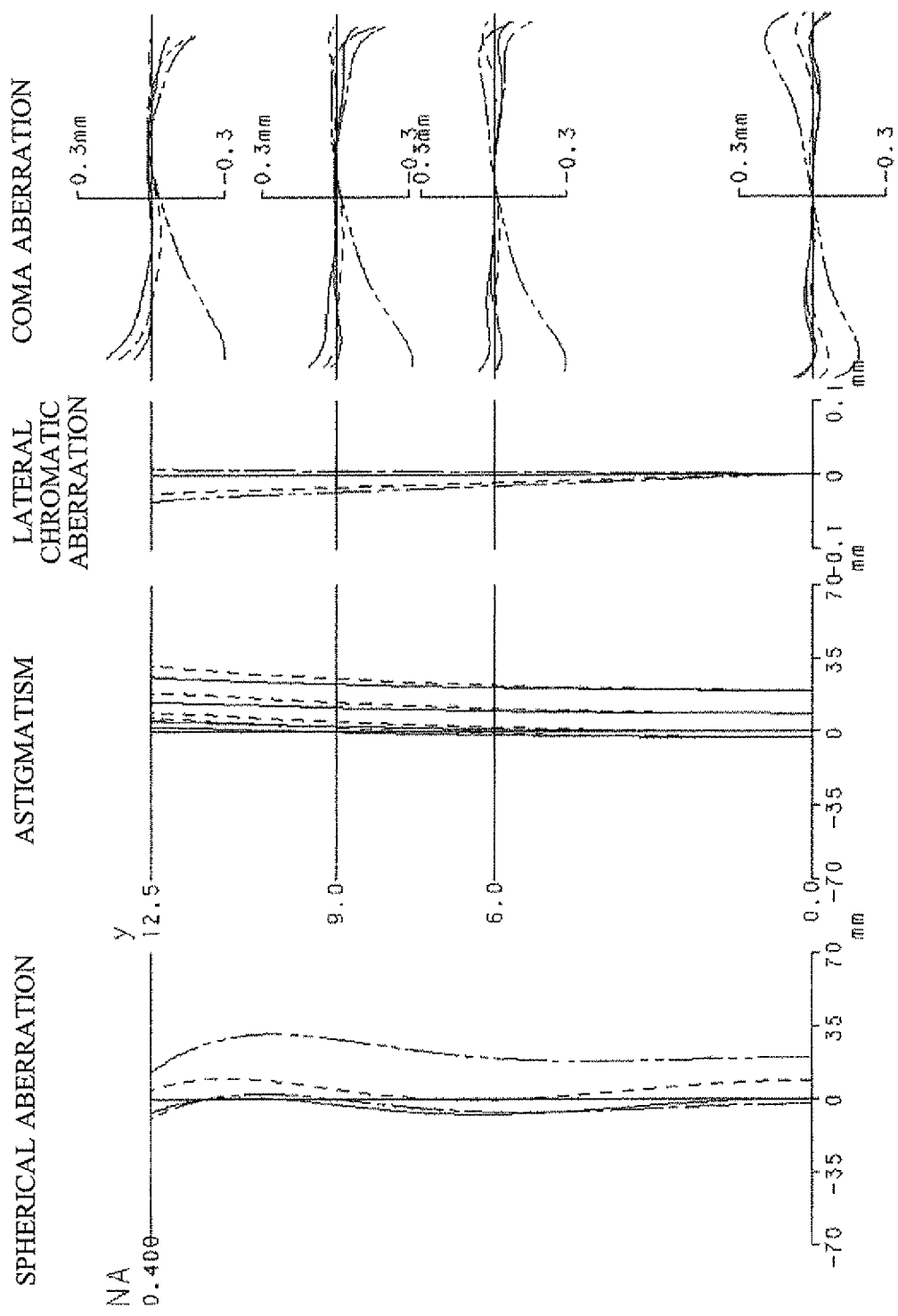
FIG. 6 is an aberrations diagram of the microscope objective lens according to the third example.

Condition Corresponding Values (1) $\phi DOE/\phi max = 0.398$
(2) $(-f2)/f = 1.925$
(3) $d0/L = 0.319$
(4) $f11/f = 7.875$
(5) $f1/f = 2.859$
(6) $\Delta v_{d1} = 47.2$
(7) $\Delta v_{d2} = 40.1$
(8) $H/d11 = 3.00$
(9) $|\phi \times H1| = 0.097$ Among the condition corresponding values shown in table 5, $\Delta v_{d1}$ of conditional expression (6) denotes the absolute value of the difference between the Abbe numbers of the biconvex lens L2 and the negative meniscus lens L3 included in the cemented positive lens CL11, $\Delta v_{d2}$ of conditional expression (7) denotes the absolute value of the difference between the Abbe numbers of the positive meniscus lens L14 and the biconcave lens L15 included in the cemented negative lens CL21, d11 of conditional expression (8) denotes the on-axis lens thickness of the positive meniscus lens L1 (surface spacing of 1st surface), and $\phi$ of conditional expression (9) denotes the power of the 1st surface. In this way, it can be recognized that conditional expressions (1) to (9) are all satisfied in the third example. FIG. 6 shows aberration diagrams of the spherical aberration, the astigmatism, the lateral chromatic aberration, and the coma aberration from the rays of the d line, the C line, the F line, and the g line according to the third example. As is clear from each aberration diagram shown in FIG. 6, it can be recognized that the aberrations are favorably corrected in the third example and excellent imaging performance is secured.

Fourth Example

A microscope objective lens OL 4 shown in FIG. 7 will be described as a fourth example. The microscope objective lens OL4 shown in FIG. 7 also includes, in order from the object side, a first lens group G1 with positive refractive power and a second lens group G2 with negative refractive power. The first lens group G1 includes, in order from the object side: a positive meniscus lens L1 with the concave surface facing the object side; a plano-convex lens L2 with the flat surface facing the object side; a cemented lens CL11 formed by bonding a biconvex lens L3 and a negative meniscus lens L4 with the concave surface facing the object side; a cemented lens CL12 formed by bonding a biconvex lens L5, a biconcave lens L6, and a biconvex lens L7; a cemented lens CL13 formed by bonding a biconvex lens L8 and a biconcave lens L9; and a diffractive optical element GD in a plate shape. The second lens group G2 includes, in order from the object side: a cemented negative lens CL21 formed by bonding a negative meniscus lens L14 with the convex surface facing the object side, a biconvex lens 15, and a biconcave lens L16; and a cemented negative lens CL22 formed by bonding a biconcave lens L17, a biconvex lens L18, and a biconcave lens L19. The surface closest to the image of the second lens group G2 (29th surface) is arranged to have a concave surface facing the image side. As described, the lens surfaces limiting the off-axis light flux that determines the off-axis principal ray and the effective diameter in the present fourth example are the surface of the positive meniscus lens L1 on the image side (2nd surface) and the surface of the biconcave lens L17 on the object side (25th surface).

In the diffractive optical element GD, a planar optical glass L10, two optical members L11 and L12 formed by different resin materials, and a planar optical glass L13 are bonded in this order, and diffraction grating grooves (diffractive optical surface D) are formed on the bonded surface of the optical members L11 and L12. Therefore, the diffractive optical element GD is a contact multi-layered diffractive optical element.

Figure 7:
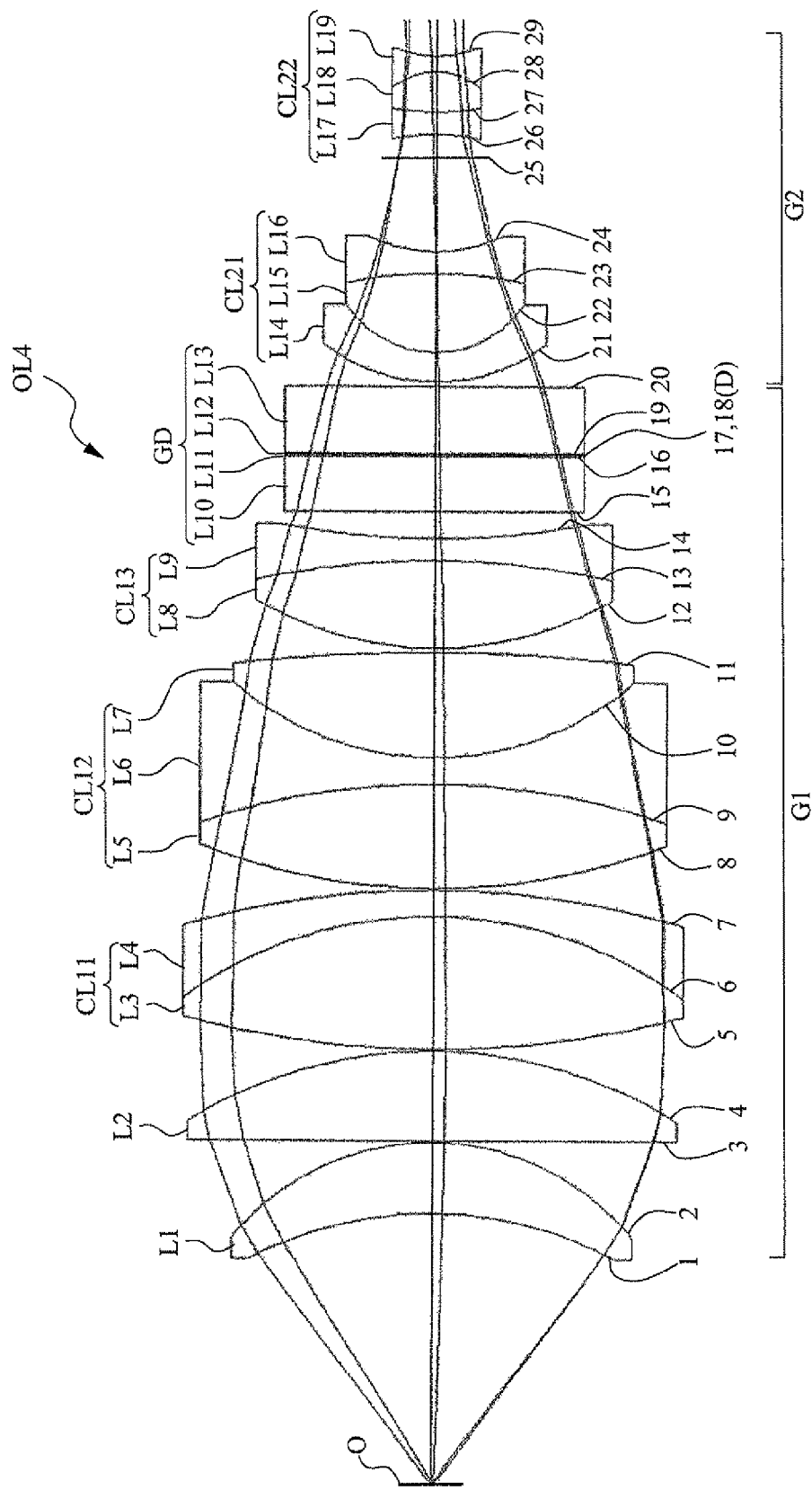
FIG. 7 is a lens configuration diagram of a microscope objective lens according to a fourth example.

Table 6 shows parameters of the microscope objective lens OL4 according to the fourth example shown in FIG. 7. The surface numbers shown in Table 6 correspond to the surface numbers 1 to 28 shown in FIG. 7.

TABLE 6

$f = 2$
$NA = 0.60$
$\beta = 100x$
$\phi max = 20.98$
$\phi DOE = 11.32$
$d0 = 12.18$
$L = 63.9$
$f1 = 11.633$
$f11 = 37.5$
$f2 = -3.5$
$H = 7.8$
$d11 = 3.2$
$H1 = 7.8$

| m | r | d | nd | vd |
|---|---|---|---|---|
| 1 | −17.818 | 3.20 | 1.72916 | 54.6 |
| 2 | −11.600 | 0.10 | | |
| 3 | 0.000 | 4.00 | 1.56907 | 71.3 |
| 4 | −20.743 | 0.10 | | |
| 5 | 45.256 | 5.90 | 1.49782 | 82.6 |
| 6 | −19.170 | 1.20 | 1.61340 | 44.3 |
| 7 | −39.808 | 0.10 | | |
| 8 | 29.510 | 4.60 | 1.49782 | 82.6 |
| 9 | −33.847 | 1.20 | 1.61340 | 44.3 |
| 10 | 13.735 | 4.70 | 1.49782 | 82.6 |
| 11 | −80.931 | 0.20 | | |
| 12 | 15.833 | 3.90 | 1.49782 | 82.6 |
| 13 | −38.548 | 1.00 | 1.72342 | 38.0 |
| 14 | 38.548 | 1.20 | | |
| 15 | 0.000 | 2.50 | 1.51680 | 63.9 |
| 16 | 0.000 | 0.06 | 1.52760 | 34.7 |
| 17 | 0.000 | 0.00 | 10001.00000 | −3.5 |
| 18* | 0.000 | 0.06 | 1.55690 | 50.2 |
| 19 | 0.000 | 3.00 | 1.51680 | 63.9 |
| 20 | 0.000 | 0.20 | | |
| 21 | 8.410 | 1.30 | 1.69350 | 53.2 |
| 22 | 4.811 | 3.50 | 1.43425 | 95.0 |
| 23 | −20.594 | 1.00 | 1.67270 | 32.2 |
| 24 | 6.950 | 4.20 | | |
| 25 | 0.000 | 1.00 | | |

TABLE 6-continued

| 26 | −10.080 | 1.00 | 1.78800 | 47.4 |
|---|---|---|---|---|
| 27 | 11.276 | 1.80 | 1.84666 | 23.8 |
| 28 | −3.092 | 0.70 | 1.69350 | 53.2 |
| 29 | 4.719 | | | |

Diffractive Optical Surface Data

| 18th Surface | κ = 0.0000 | A2 = −4.11668E−08. |
|---|---|---|
| | A4 = −8.52212E−11 | A6 = −7.60013E−14 |
| | A8 = −3.05264E−17 | A10 = 0.00000E+00 |

Condition Corresponding Values (1) φDOE/φmax = 0.540
(2) (−f2)/f = 1.75
(3) d0/L = 0.191
(4) f11/f = 18.75
(5) f1/f = 5.817
(6) $\Delta v_{d1}$ = 44.6
(7) $\Delta v_{d2}$ = 62.8
(8) H/d11 = 2.44
(9) |φ × H1| = 0.319

Figure 8:
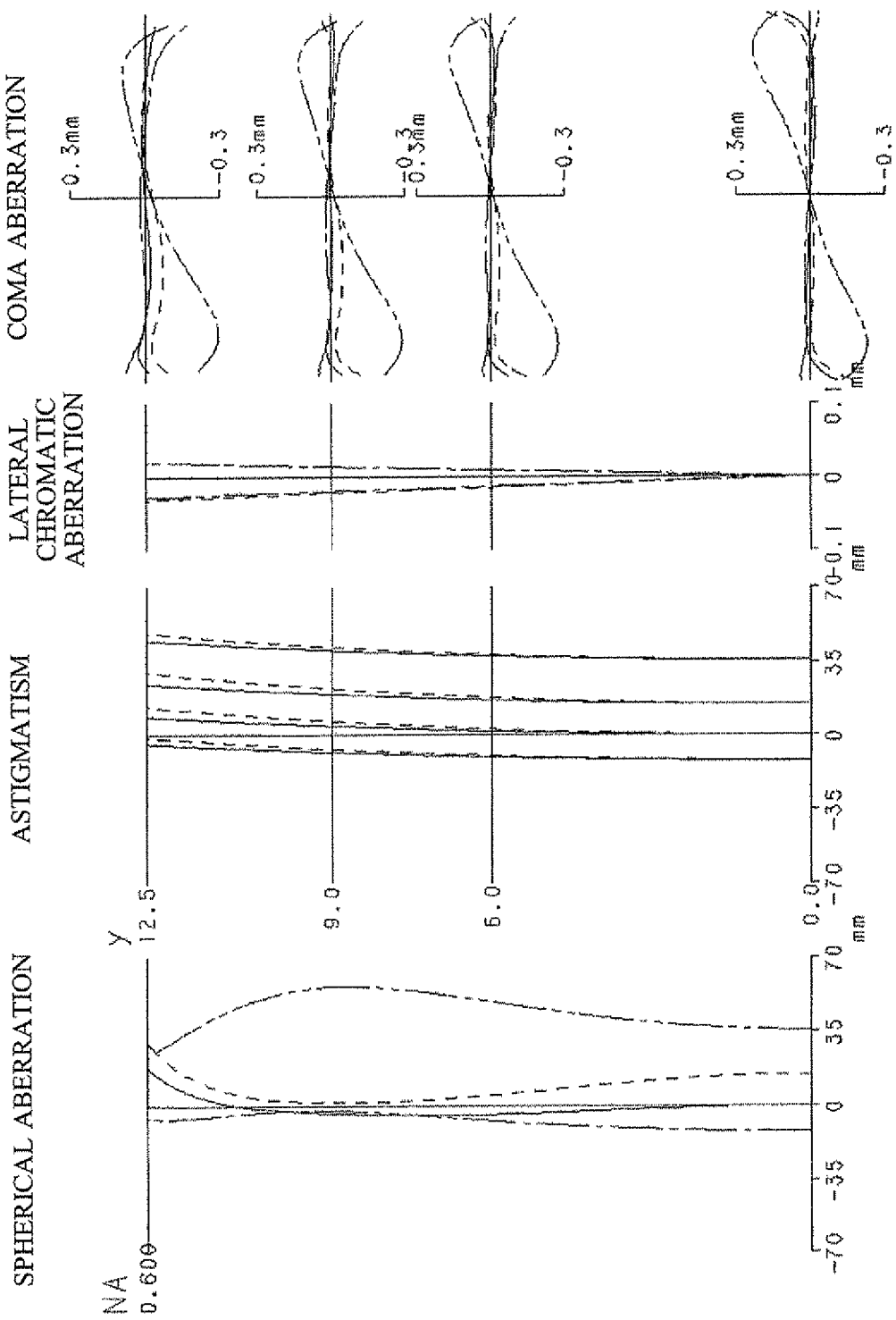
FIG. 8 is an aberrations diagram of the microscope objective lens according to the fourth example.

Among the condition corresponding values shown in table 6, $\Delta v_{d1}$ of conditional expression (6) denotes the absolute value of the difference between the Abbe numbers of the biconvex lens L8 and the biconcave lens L9 included in the cemented positive lens CL13, $\Delta v_{d2}$ of conditional expression (7) denotes the absolute value of the difference between the Abbe numbers of the biconvex lens L15 and the biconcave lens L16 included in the cemented negative lens CL21, d11 of conditional expression (8) denotes the on-axis lens thickness of the positive meniscus lens L1 (surface spacing of 1st surface), and φ of conditional expression (9) denotes the power of the 1st surface. In this way, it can be recognized that conditional expressions (1) to (9) are all satisfied in the fourth example. FIG. 8 shows aberration diagrams of the spherical aberration, the astigmatism, the lateral chromatic aberration, and the coma aberration from the rays of the d line, the C line, the F line, and the g line according to the fourth example. As is clear from each aberration diagram shown in FIG. 8, it can be recognized that the aberrations are favorably corrected in the fourth example and excellent imaging performance is secured.

Fifth Example

A microscope objective lens OL5 shown in FIG. 9 will be described as a fifth example. The microscope objective OL5 shown in FIG. 9 also includes, in order from the object side, a first lens group G1 with positive refractive power and a second lens group G2 with negative refractive power. The first lens group G1 includes, in order from the object side: a positive meniscus lens L1 with the concave surface facing the object side; a positive meniscus lens L2 with the concave surface facing the object side; a cemented lens CL11 formed by bonding a biconvex lens L3, a biconcave lens L4, and a biconvex lens L5; a cemented lens CL12 formed by bonding a biconvex lens L6 and a negative meniscus lens L7 with the concave surface facing the object side; a cemented lens CL 13 formed by bonding a biconvex lens L8 and a biconcave lens L9; and a diffractive optical element GD in a plate shape. The second lens group G2 includes, in order from the object side: a cemented negative lens CL21 formed by bonding a negative meniscus lens L14 with the convex surface facing the object side, a biconvex lens L15, and a biconcave lens L16; and a cemented negative lens CL22 formed by bonding a biconcave lens L17, a biconvex lens L18, and a biconcave lens L19. The surface closest to the image of the second lens group G2 (29th surface) is arranged to have a concave surface facing the image side. As described, the lens surfaces limiting the off-axis light flux that determines the off-axis principal ray and the effective diameter in the present fifth example are the surface of the positive meniscus lens L1 on the image side (2nd surface) and the surface of the biconcave lens L17 on the object side (25th surface).

In the diffractive optical element GD, a planar optical glass L10, two optical members L11 and L12 formed by different resin materials, and a planar optical glass L13 are bonded in this order, and diffraction grating grooves (diffractive optical surface D) are formed on the bonded surface of the optical members L11 and L12. More specifically, the diffractive optical element GD is a contact multi-layered diffractive optical element.

Figure 9:
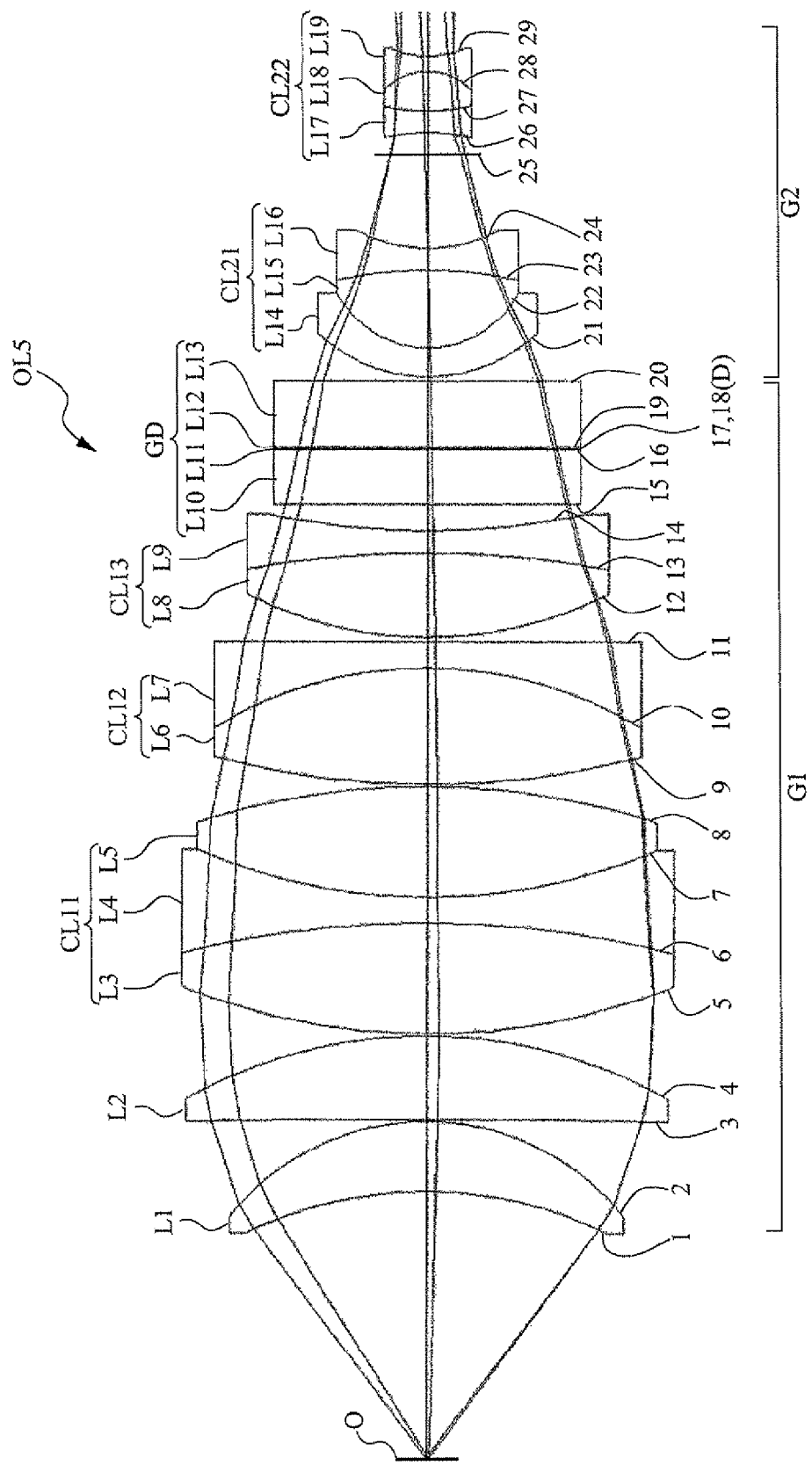
FIG. 9 is a lens configuration diagram of a microscope objective lens according to a fifth example.

Table 7 shows parameters of the microscope objective lens OL5 according to the fifth example shown in FIG. 9. The surface numbers shown in table 7 correspond to the surface numbers 1 to 28 shown in FIG. 9.

TABLE 7 f = 2
NA = 0.60
β = 100x
φmax = 20.79
φDOE = 11.88
d0 = 12.18
L = 63.7
f1 = 11.76
f11 = 33.7
f2 = −3.8
H = 7.86
d11 = 3.2
H1 = 7.86

| m | r | d | nd | νd |
|---|---|---|---|---|
| 1 | −19.000 | 3.20 | 1.72916 | 54.6 |
| 2 | −11.479 | 0.10 | | |
| 3 | −500.000 | 3.80 | 1.59240 | 68.3 |
| 4 | −22.632 | 0.10 | | |
| 5 | 30.812 | 5.00 | 1.49782 | 82.6 |
| 6 | −46.563 | 1.20 | 1.61340 | 44.3 |
| 7 | 26.659 | 5.00 | 1.49782 | 82.6 |
| 8 | −35.040 | 0.10 | | |
| 9 | 38.948 | 5.30 | 1.60300 | 65.4 |
| 10 | −18.566 | 1.20 | 1.72342 | 37.9 |
| 11 | −618.196 | 0.20 | | |
| 12 | 18.233 | 3.80 | 1.49782 | 82.6 |
| 13 | −45.081 | 1.00 | 1.72342 | 38.0 |
| 14 | 35.407 | 1.20 | | |
| 15 | 0.000 | 2.50 | 1.51680 | 63.9 |
| 16 | 0.000 | 0.06 | 1.52760 | 34.7 |
| 17 | 0.000 | 0.00 | 10001.00000 | −3.5 |
| 18* | 0.000 | 0.06 | 1.55690 | 50.2 |
| 19 | 0.000 | 3.00 | 1.51680 | 63.9 |
| 20 | 0.000 | 0.20 | | |
| 21 | 7.371 | 1.30 | 1.69350 | 53.2 |
| 22 | 4.721 | 3.50 | 1.43425 | 95.0 |
| 23 | −19.133 | 1.00 | 1.64769 | 33.7 |
| 24 | 6.922 | 4.20 | | |
| 25 | 0.000 | 1.00 | | |
| 26 | −8.906 | 1.00 | 1.80440 | 39.6 |
| 27 | 8.297 | 1.80 | 1.84666 | 23.8 |
| 28 | −2.816 | 0.70 | 1.69350 | 53.2 |
| 29 | 4.255 | | | |

Diffractive Optical Surface Data

| 18th Surface | κ = 0.0000 | A2 = −6.66667E−08. |
|---|---|---|
| | A4 = 8.55266E−12 | A6 = −7.13250E−14 |
| | A8 = 8.32008E−18 | A10 = 0.00000E+00 |

TABLE 7-continued

Condition Corresponding Values (1) φDOE/φmax = 0.571
(2) (−f2)/f = 1.9
(3) d0/L = 0.191
(4) f11/f = 16.85
(5) f1/f = 5.88
(6) $\Delta v_{d1}$ = 44.6
(7) $\Delta v_{d2}$ = 61.3
(8) H/d11 = 2.46
(9) |φ × H1| = 0.302

Figure 10:
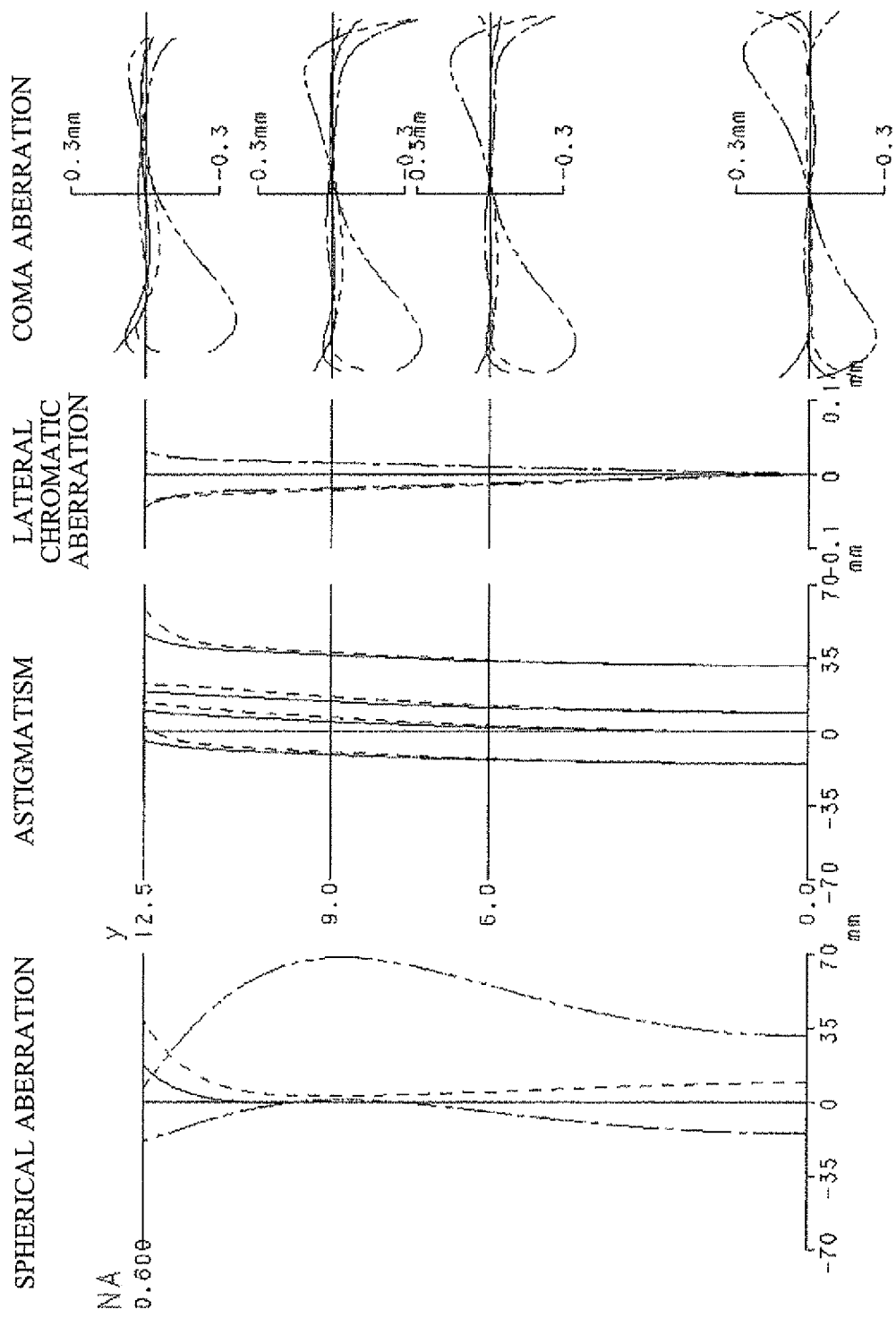
FIG. 10 is an aberrations diagram of the microscope objective lens according to the fifth example.

Among the condition corresponding values shown in table 7, $\Delta v_{d1}$ of conditional expression (6) denotes the absolute value of the difference between the Abbe numbers of the biconvex lens L8 and the biconcave lens L9 included in the cemented positive lens CL13, $\Delta v_{d2}$ of conditional expression (7) denotes the absolute value of the difference between the Abbe numbers of the biconvex lens L15 and the biconcave lens L16 included in the cemented negative lens CL21, d11 of conditional expression (8) denotes the on-axis lens thickness of the positive meniscus lens L1 (surface spacing of 1st surface), and φ of conditional expression (9) denotes the power of the 1st surface. In this way, it can be recognized that conditional expressions (1) to (9) are all satisfied in the fifth example. FIG. 10 shows aberration diagrams of the spherical aberration, the astigmatism, the lateral chromatic aberration, and the coma aberration from the rays of the d line, the C line, the F line, and the g line according to the fifth example. As is clear from each aberration diagram shown in FIG. 10, it can be recognized that the aberrations are favorably corrected in the fifth example and excellent imaging performance is secured.

Sixth Example

A microscope objective lens OL6 shown in FIG. 11 will be described as a sixth example. The microscope objective lens OL6 also includes, in order from the object side, a first lens group G1 with positive refractive power and a second lens group G2 with negative refractive power. The first lens group G1 includes, in order from the object side: a biconvex lens L1; a cemented positive lens CL11 formed by bonding a negative meniscus lens L2 with the convex surface facing the object side and a biconvex lens L3; a cemented positive lens CL 12 formed by bonding a biconvex lens L4 and a negative meniscus lens L5 with the concave surface facing the object side; and a diffractive optical element GD with positive refractive power. The second lens group G2 includes, in order from the object side: a cemented negative lens CL21 formed by bonding a biconvex lens L10 and a biconcave lens L11; and a cemented negative lens CL22 formed by bonding a positive meniscus lens L12 with the concave surface facing the object side and a biconcave lens L13. The surface closest to the image of the second lens group G2 (20th surface) is arranged to have a concave surface facing the image side. As described, the lens surfaces limiting the off-axis light flux that determines the off-axis principal ray and the effective diameter in the present sixth embodiment are the surface of the biconvex lens L1 on the image side (2nd surface) and the surface of the positive meniscus lens L12 on the object side (18th surface).

In the diffractive optical element GD, a planar optical glass L6, two optical members L7 and L8 formed by different resin materials, and a planar optical glass L9 are bonded in this order, and diffraction grating grooves (diffractive optical surface D) are formed on the bonded surface of the optical members L7 and L8. Therefore, the diffractive optical element GD is a contact multi-layered diffractive optical element.

Figure 11:
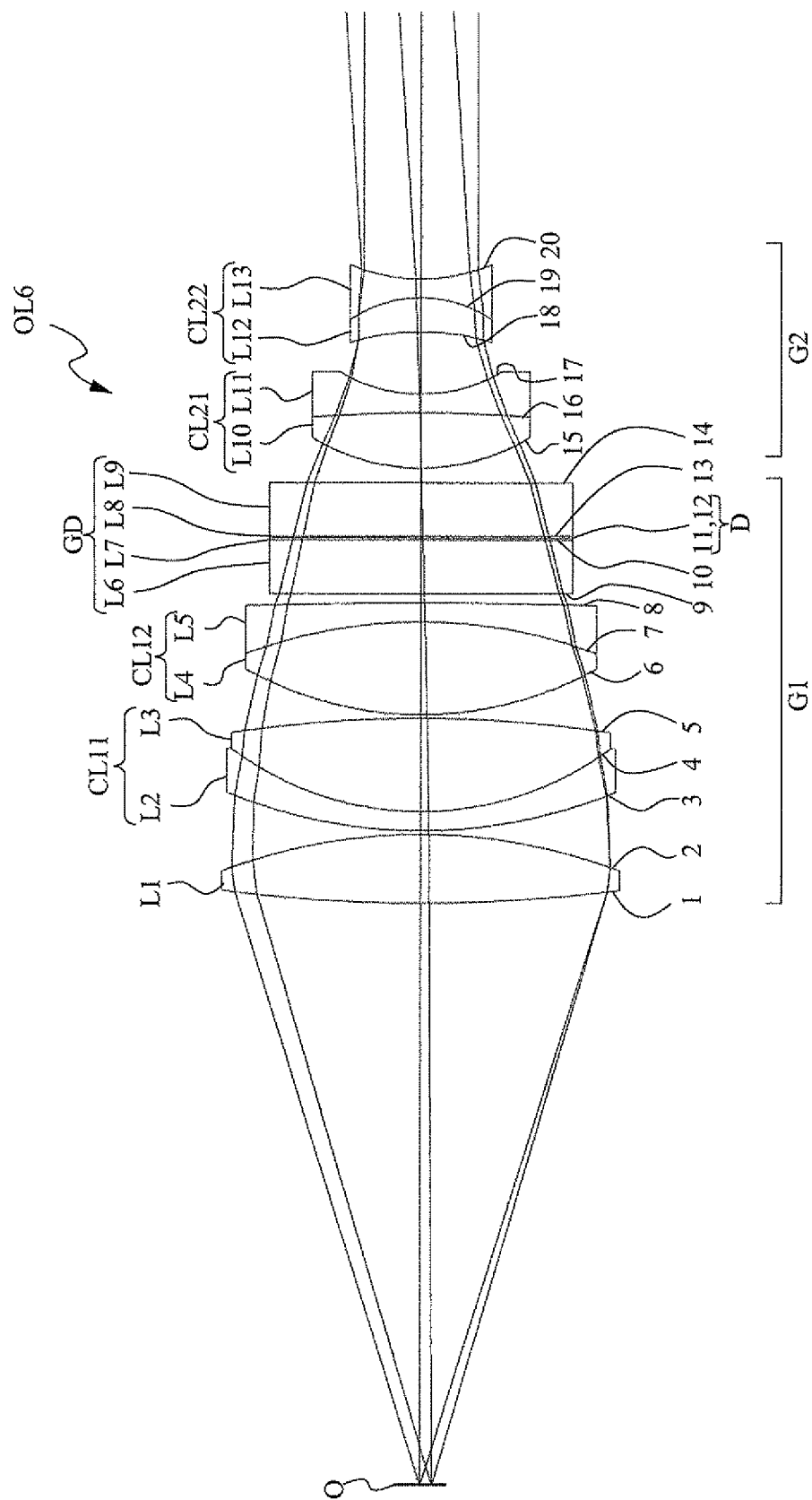
FIG. 11 is a lens configuration diagram of a microscope objective lens according to a sixth example.

Table 8 shows parameters of the microscope objective lens OL6 according to the sixth example shown in FIG. 11.

TABLE 8 f = 10
NA = 0.30
β = 20x
φmax = 19.98
φDOE = 13.56
d0 = 30.66
L = 63.56
f1 = 15.1
f11 = 31.15
f2 = −8.1
H = 9.84
d11 = 3.60
H1 = 9.84

| m | r | d | nd | vd |
|---|---|---|---|---|
| 1 | 82.361 | 3.60 | 1.713 | 54.0 |
| 2 | −29.860 | 0.20 | | |
| 3 | 27.256 | 1.00 | 1.785 | 25.6 |
| 4 | 16.780 | 4.90 | 1.498 | 82.6 |
| 5 | −66.292 | 0.20 | | |
| 6 | 18.895 | 4.90 | 1.498 | 82.6 |
| 7 | −26.174 | 1.00 | 1.801 | 34.9 |
| 8 | −289.941 | 0.50 | | |
| 9 | 0.000 | 2.80 | 1.517 | 63.9 |
| 10 | 0.000 | 0.10 | 1.557 | 50.2 |
| 11 | 0.000 | 0.00 | 10001.000 | −3.5 |
| 12* | 0.000 | 0.10 | 1.528 | 34.7 |
| 13 | 0.000 | 2.80 | 1.517 | 63.9 |
| 14 | 0.000 | 0.80 | | |
| 15 | 11.035 | 2.90 | 1.548 | 45.5 |
| 16 | −80.027 | 1.00 | 1.804 | 46.6 |
| 17 | 8.351 | 3.30 | | |
| 18 | −12.767 | 1.80 | 1.847 | 23.8 |
| 19 | −6.601 | 1.00 | 1.564 | 60.7 |
| 20 | 9.751 | | | |

Diffractive Optical Surface Data

12th Surface  κ = 1.0000       A2 = −5.50000E−08
              A4 = 3.45643E−10  A6 = −6.04217E−12
              A8 = 4.24525E−14  A10 = 0.00000E+00

Condition Corresponding Values (1) φDOE/φmax = 0.679
(2) (−f2)/f = 0.809
(3) d0/L = 0.481
(4) f11/f = 3.12
(5) f1/f = 1.51
(6) $\Delta v_{d1}$ = 56.93
(7) $\Delta v_{d2}$ = 36.91
(8) H/d11 = 2.73
(9) |φ × H1| = 0.085

Figure 12:
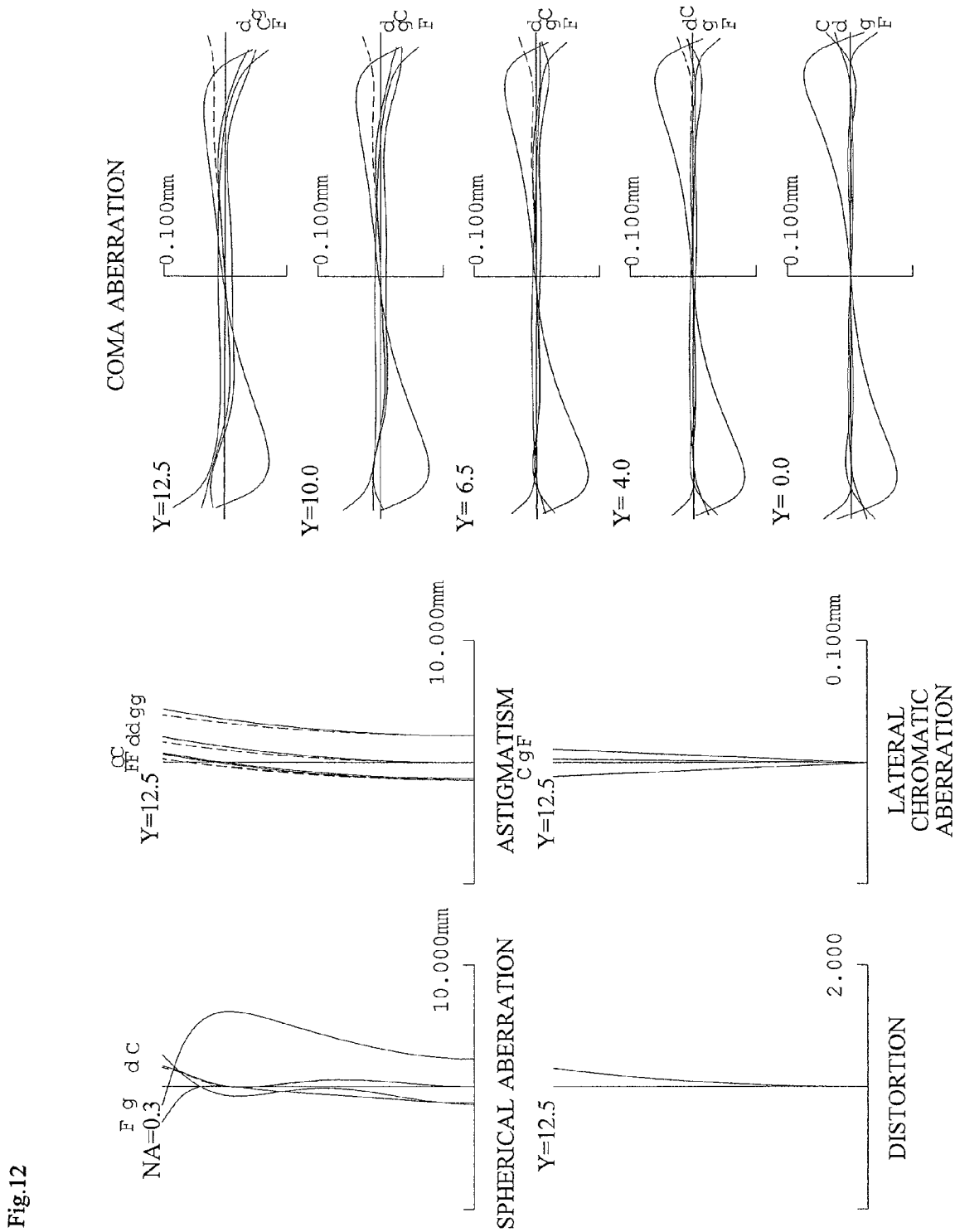
FIG. 12 is an aberrations diagram of the microscope objective lens according to the sixth example.

Among the condition corresponding values shown in table 8, $\Delta v_{d1}$ of conditional expression (6) denotes the absolute value of the difference between the Abbe numbers of the negative meniscus lens L2 and the biconvex lens L3 included in the cemented positive lens CL11, $\Delta v_{d2}$ of conditional expression (7) denotes the absolute value of the difference between the Abbe numbers of the negative meniscus lens L12 and the biconcave lens L13 included in the cemented negative lens CL22, d11 of conditional expression (8) denotes the on-axis lens thickness of the biconvex lens L1 (surface spacing of 1st surface), and φ of conditional expression (9) denotes the power of the 1st surface. In this way, it can be recognized that conditional expressions (1) to (9) are all satisfied in the sixth example. FIG. 12 shows aberration diagrams of the spherical aberration, the astigmatism, the distortion, the lateral chromatic aberration, and the coma aberration from the rays of the d line, the C line, the F line, and the g line of the microscope objective lens OL6 according to the sixth example. The coma aberrations of the present sixth example to a ninth example indicate amounts of aberrations when the image height Y is 12.5 mm, 10.0 mm, 6.5 mm, 4.0 mm, and 0.0 nm. As is clear from each aberration diagram shown in FIG. 12, it can be recognized that the aberrations are favorably corrected in the sixth example and excellent imaging performance is secured.

Seventh Example

A microscope objective lens OL7 shown in FIG. 13 will be described as a seventh example. The microscope objective lens OL7 shown in FIG. 13 also includes, in order from the object side, a first lens group G1 with positive refractive power and a second lens group G2 with negative refractive power. The first lens group G1 includes, in order from the object side: a biconvex lens L1; a cemented positive lens CL11 formed by bonding a biconvex lens L2 and a negative meniscus lens L3 with the concave surface facing the object side; a positive meniscus lens L4 with the convex surface facing the object side; and a diffractive optical element GD with positive refractive power. The second lens group G2 includes a cemented negative lens CL21 formed by bonding a positive meniscus lens L9 with the concave surface facing the object side and a biconcave lens L10, in order from object side. The surface closest to the image of the second lens group G2 (16th surface) is arranged to have a concave surface facing the image side. As described, the lens surfaces limiting the off-axis light flux that determines the off-axis principal ray and the effective diameter in the present seventh example are the surface of the biconvex lens L1 on the image side (2nd surface) and the surface of the biconcave lens L10 on the image side (16th surface).

In the diffractive optical element GD, a planar optical glass L5, two optical members L6 and L7 formed by different resin materials, and a planar optical glass L8 are bonded in this order, and diffraction grating grooves (diffractive optical surface D) are formed on the bonded surface of the optical members L6 and L7. Therefore, the diffractive optical element GD is also a contact multi-layered diffractive optical element.

Figure 13:
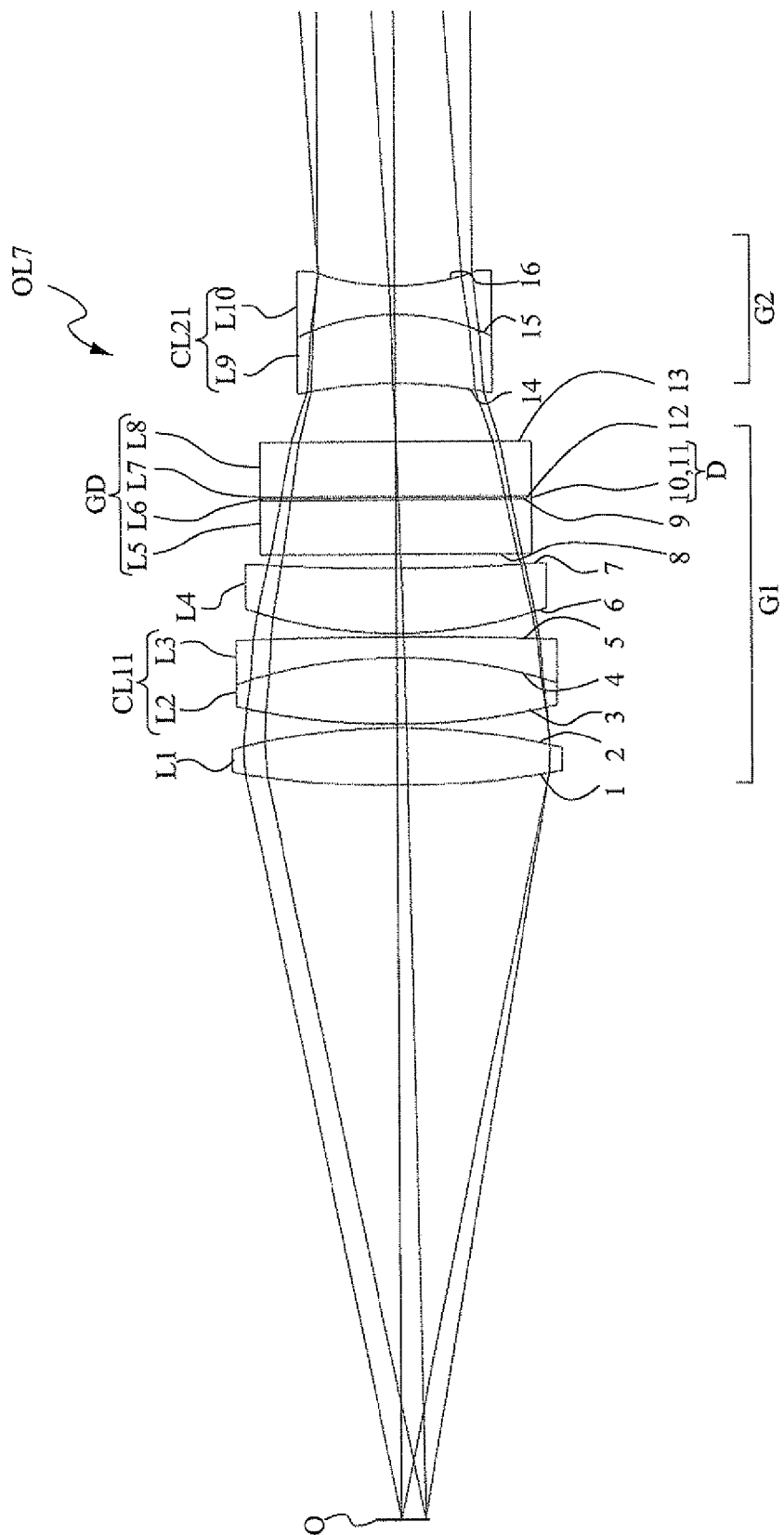
FIG. 13 is a lens configuration diagram of a microscope objective lens according to a seventh example.

Table 9 shows parameters of the microscope objective lens OL7 according to the seventh example shown in FIG. 13. The surface numbers shown in Table 9 correspond to the surface numbers 1 to 16 shown in FIG. 13.

TABLE 9 f = 20
NA = 0.2
β = 10x
φmax = 15.78
φDOE = 11.86
d0 = 37.68
L = 63.43
f1 = 16.54
f11 = 29.13
f2 = −14.11
H = 7.85
d11 = 3.00
H1 = 7.85

| m | r | d | nd | vd |
|---|---|---|---|---|
| 1 | 48.798 | 3.00 | 1.697 | 55.5 |
| 2 | −33.895 | 0.20 | | |
| 3 | 37.001 | 3.40 | 1.603 | 65.4 |

TABLE 9-continued

| | | | | |
|---|---|---|---|---|
| 4 | −26.530 | 1.10 | 1.847 | 23.8 |
| 5 | −212.805 | 0.20 | | |
| 6 | 24.500 | 3.30 | 1.517 | 63.9 |
| 7 | 116.697 | 0.70 | | |
| 8 | 0.000 | 2.80 | 1.517 | 63.9 |
| 9 | 0.000 | 0.10 | 1.557 | 50.2 |
| 10 | 0.000 | 0.00 | 10001.000 | −3.5 |
| 11* | 0.000 | 0.10 | 1.528 | 34.7 |
| 12 | 0.000 | 2.80 | 1.517 | 63.9 |
| 13 | 0.000 | 3.05 | | |
| 14 | −23.277 | 3.50 | 1.805 | 25.5 |
| 15 | −11.689 | 1.50 | 1.620 | 60.3 |
| 16 | 12.655 | | | |

Diffractive Optical Surface Data

| 11th Surface | κ = 1.0000 | A2 = −4.93877E−08 |
| | A4 = 3.00805E−12 | A6 = −3.35037E−19 |
| | A8 = −1.66824E−15 | A10 = 0.00000E+00 |

Condition Corresponding values (1) φDOE/max = 0.752
(2) (−f2)/f = 0.706
(3) d0/L = 0.594
(4) f11/f = 1.46
(5) f1/f = 0.827
(6) $\Delta v_{d1}$ = 41.6
(7) $\Delta v_{d2}$ = 34.8
(8) H/d11 = 2.62
(9) |φ × H1| = 0.112

Figure 14:
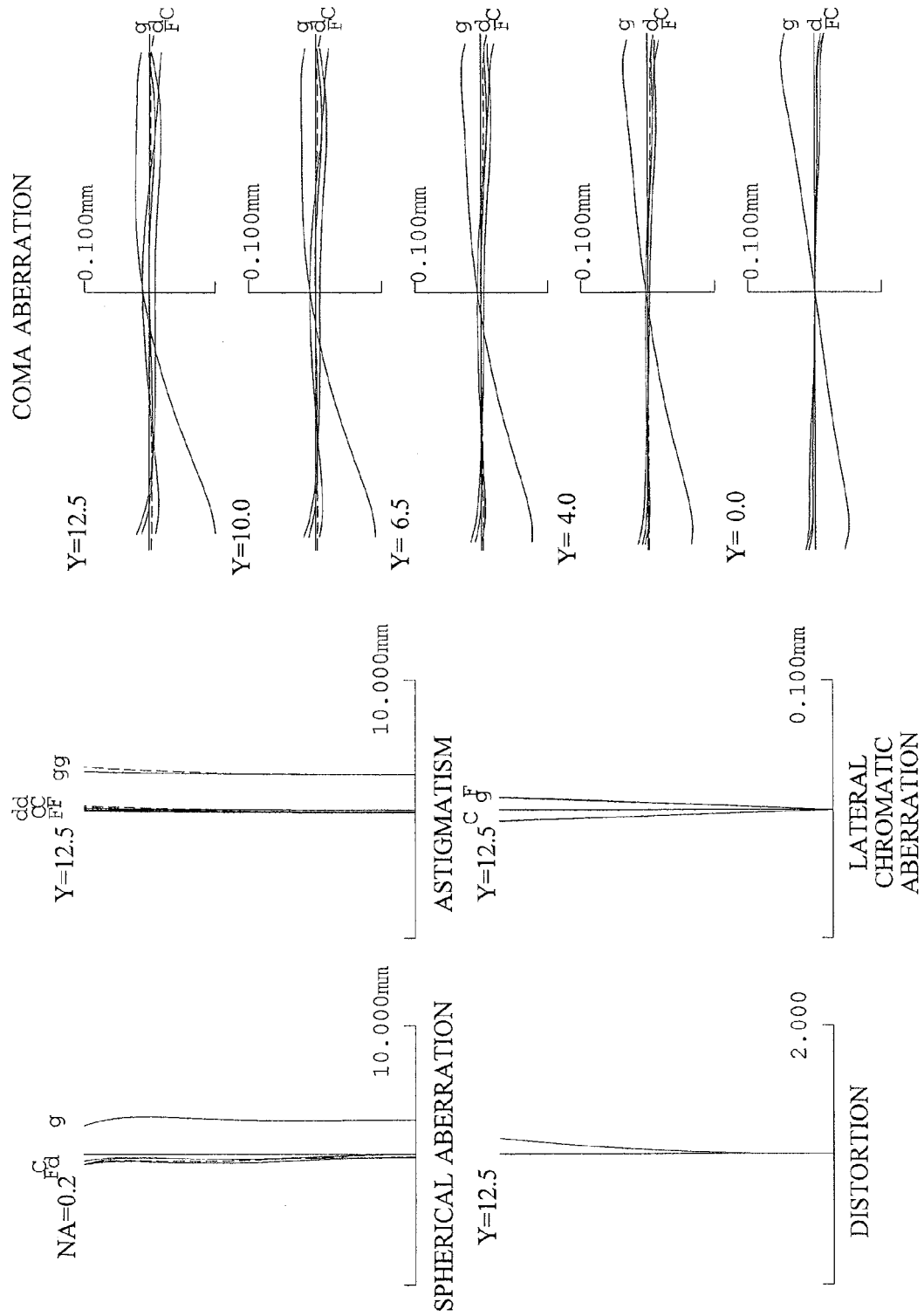
FIG. 14 is an aberrations diagram of the microscope objective lens according to the seventh example.

Among the condition corresponding values shown in table 9, $\Delta v_{d1}$ of conditional expression (6) denotes the absolute value of the difference between the Abbe numbers of the biconvex lens L2 and the negative meniscus lens L3 included in the cemented positive lens CL11, $\Delta v_{d2}$ of conditional expression (7) denotes the absolute value of the difference between the Abbe numbers of the positive meniscus lens L9 and the biconcave lens L10 included in the cemented negative lens CL12, d11 of conditional expression (8) denotes the on-axis lens thickness of the biconvex lens L1 (surface spacing of 1st surface), and φ of conditional expression (9) denotes the power of the 1st surface. In this way, it can be recognized that conditional expressions (1) to (9) are all satisfied in the seventh example. FIG. 14 shows aberration diagrams of the spherical aberration, the astigmatism, the distortion, the lateral chromatic aberration, and the coma aberration of the microscope objective lens OL7 according to the seventh example. As is clear from each aberration diagram shown in FIG. 14, it can be recognized that the aberrations are favorably corrected in the seventh example and excellent imaging performance is secured.

Eighth Example

Figure 15:
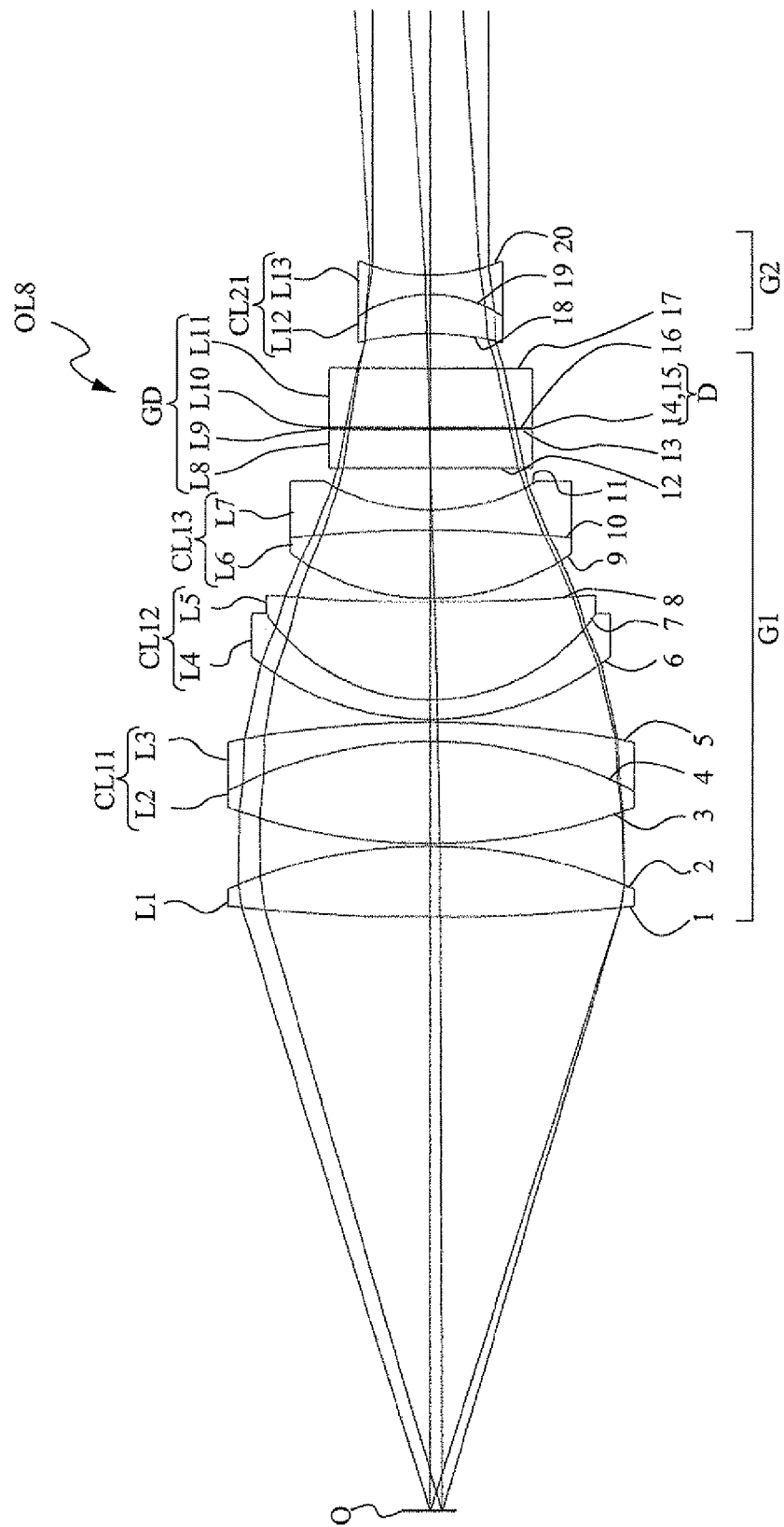
FIG. 15 is a lens configuration diagram of a microscope objective lens according to an eighth example.

A microscope objective lens OL8 shown in FIG. 15 will be described as an eighth example. A microscope objective lens OL8 shown in FIG. 15 also includes, in order from the object side, a first lens group G1 with positive refractive power and a second lens group G2 with negative refractive power. The first lens group G1 includes, in order from the object side: a biconvex lens L1; a cemented positive lens CL11 formed by bonding a biconvex lens L2 and a negative meniscus lens L3 with the concave surface facing the object side; a cemented positive lens CL12 formed by bonding a negative meniscus lens L4 with the convex surface facing the object side and a positive meniscus lens L5 with the convex surface facing the object side; a cemented negative lens CL13 formed by bonding a biconvex lens L6 and a biconcave lens L7; and a diffractive optical element GD with positive refractive power.

The second lens group G2 includes a cemented negative lens CL21 formed by bonding a positive meniscus lens L12 with the concave surface facing the object side and a biconcave lens L13 in order from the object side. The surface closest to the image of the second lens group G2 (20th surface) is arranged to have a concave surface facing the image side. As described, the lens surfaces limiting the off-axis light flux that determines the off-axis principal ray and the effective diameter in the present eighth example are the surface of the biconvex lens L1 on the image side (2nd surface) and the surface of the positive meniscus lens L12 on the object side (18th surface).

In the diffractive optical element GD, a planar optical glass L8, two optical members L9 and L10 formed by different resin materials, and a planar optical glass L11 are bonded in this order, and diffraction grating grooves (diffractive optical surface D) are formed on the bonded surface of the optical members L9 and L10. Therefore, the diffractive optical element GD is also a contact multi-layered diffractive optical element. Furthermore, Table 10 shows parameters of the microscope objective lens OL8 according to the eighth example shown in FIG. 15. The surface numbers shown in Table 10 correspond to the surface numbers 1 to 20 shown in FIG. 15.

TABLE 10 f = 10
NA = 0.3
β = 20x
φmax = 19.9
φDOE = 8.82
d0 = 30.6
L = 63.7
f1 = 14.49
f11 = 33.43
f2 = −10.27
H = 9.78
d11 = 3.68
H1 = 9.78

| m | r | d | nd | vd |
|---|---|---|---|---|
| 1 | 98.000 | 3.68 | 1.620 | 60.3 |
| 2 | −25.930 | 0.15 | | |
| 3 | 30.731 | 5.25 | 1.498 | 82.5 |
| 4 | −22.767 | 1.00 | 1.717 | 29.5 |
| 5 | −53.014 | 0.15 | | |
| 6 | 15.006 | 1.00 | 1.804 | 33.9 |
| 7 | 10.412 | 5.00 | 1.498 | 82.5 |
| 8 | 94.868 | 0.20 | | |
| 9 | 12.450 | 3.55 | 1.498 | 82.5 |
| 10 | −62.164 | 1.00 | 1.729 | 54.7 |
| 11 | 10.750 | 2.20 | | |
| 12 | 0.000 | 2.00 | 1.517 | 64.1 |
| 13 | 0.000 | 0.06 | 1.557 | 50.2 |
| 14 | 0.000 | 0.00 | 10001.000 | −3.5 |
| 15* | 0.000 | 0.06 | 1.528 | 34.7 |
| 16 | 0.000 | 3.00 | 1.517 | 64.1 |
| 17 | 0.000 | 1.80 | | |
| 18 | −15.000 | 2.00 | 1.847 | 23.8 |
| 19 | −6.739 | 1.00 | 1.640 | 60.1 |
| 20 | 9.369 | | | |

Diffractive Optical Surface Data

| 15th Surface | κ = 1.0000 | A2 = −5.70000E−08 |
|---|---|---|
| | A4 = 1.01149E−09 | A6 = −4.05811E−11 |
| | A8 = 4.84818E−13 | A10 = 0.00000E+00 |

Condition Corresponding Values (1) φDOE/φmax = 0.443
(2) (−f2)/f = 1.027
(3) d0/L = 0.48
(4) f11/f = 3.343

TABLE 10-continued (5) f1/f = 1.449
(6) $\Delta v_{d1}$ = 53.0
(7) $\Delta v_{d2}$ = 36.31
(8) H/d11 = 2.66
(9) |φ × H1| = 0.062

Figure 16:
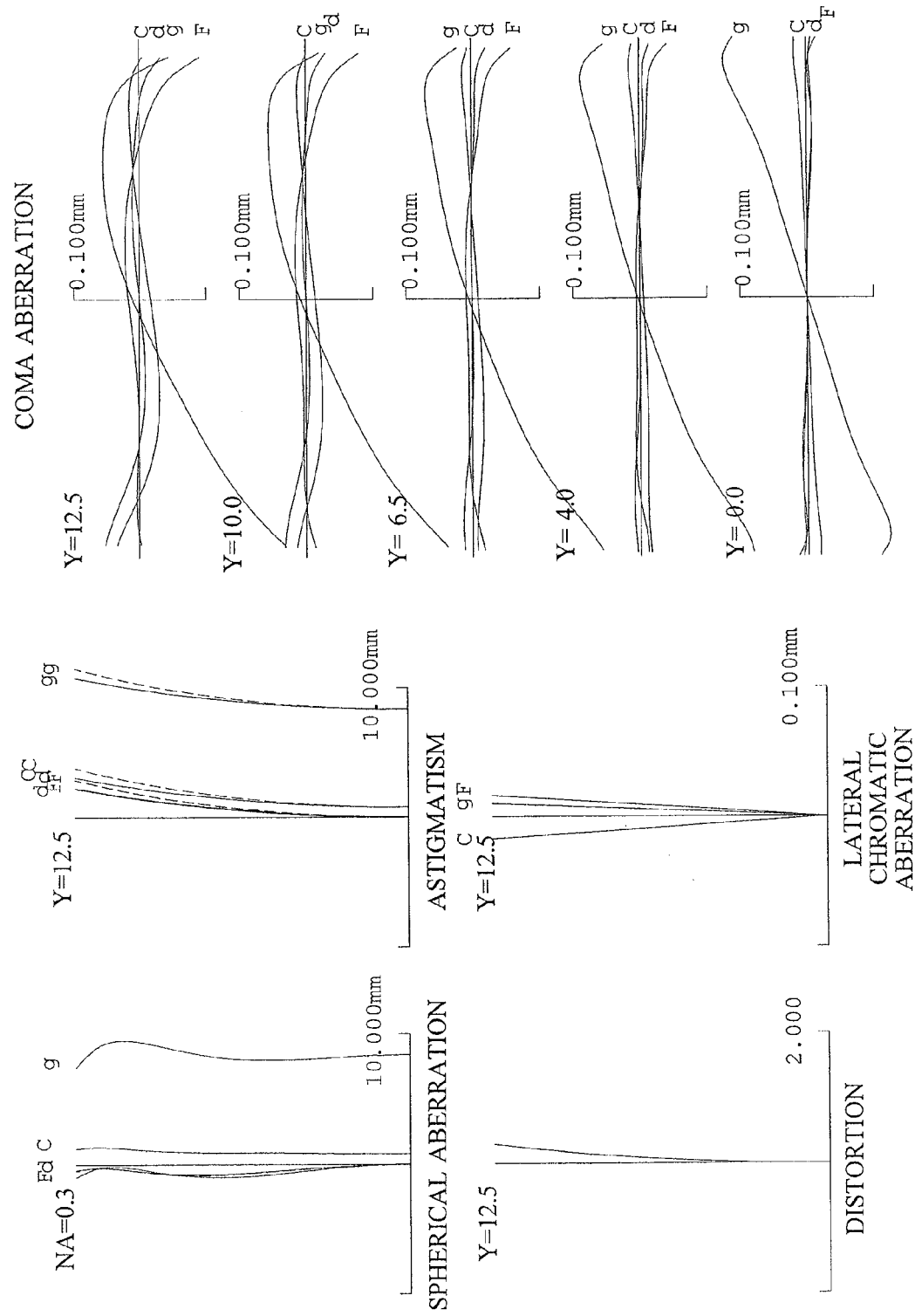
FIG. 16 is an aberrations diagram of the microscope objective lens according to the eighth example.

Among the condition corresponding values shown in table 10, $\Delta v_{d1}$ of conditional expression (6) denotes the absolute value of the difference between the Abbe numbers of the biconvex lens L2 and the negative meniscus lens L3 included in the cemented positive lens CL11, $\Delta v_{d2}$ of conditional expression (7) denotes the absolute value of the difference between the Abbe numbers of the positive meniscus lens L12 and the biconcave lens L13 included in the cemented negative lens CL21, d11 of conditional expression (8) denotes the on-axis lens thickness of the biconvex lens L1 (surface spacing of 1st surface), and φ of conditional expression (9) denotes the power of the 1st surface. In this way, it can be recognized that conditional expressions (1) to (9) are all satisfied in the eighth example. FIG. 16 shows aberration diagrams of the spherical aberration, the astigmatism, the distortion, the lateral chromatic aberration, and the coma aberration of the microscope objective lens OL8 according to the eighth example. As is clear from each aberration diagram shown in FIG. 16, it can be recognized that the aberrations are favorably corrected in the eighth example and excellent imaging performance is secured.

Ninth Example

Figure 17:
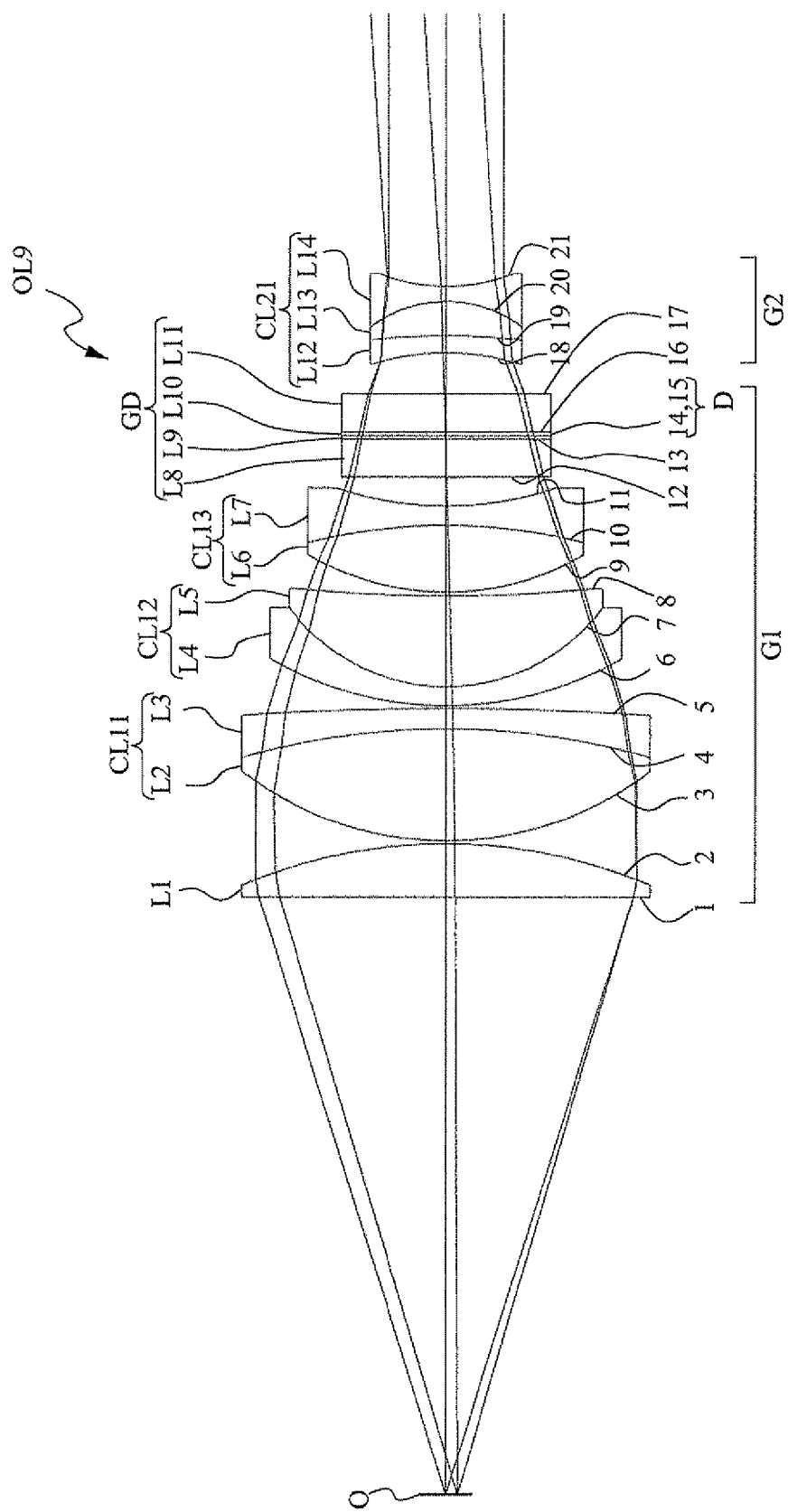
FIG. 17 is a lens configuration diagram of a microscope objective lens according to a ninth example.

Lastly, a microscope objective lens OL9 shown in FIG. 17 will be described as a ninth example. The microscope objective lens OL9 shown in FIG. 17 also includes, in order from the object side, a first lens group G1 with positive refractive power and a second lens group G2 with negative refractive power. The first lens group G1 includes, in order from the object side: a biconvex lens L1; a cemented positive lens CL11 formed by bonding a biconvex lens L2 and a negative meniscus lens L3 with the concave surface facing the object side; a cemented positive lens CL12 formed by bonding a negative meniscus lens L4 with the convex surface facing the object side and a positive meniscus lens L5 with the convex surface facing the object side; a cemented negative lens CL13 formed by bonding a biconvex lens L6 and a biconcave lens L7; and a diffractive optical element GD with positive refractive power. The second lens group G2 includes a cemented negative lens CL21 formed by bonding a negative meniscus lens L12 with the concave surface facing the object side, a positive meniscus lens L13 with the concave surface facing the object side, and a biconcave lens L14 in order from the object side. The surface closest to the image of the second lens group G2 (21st surface) is arranged to have a concave surface facing the image side. As described, the lens surfaces limiting the off-axis light flux that determines the off-axis principal ray and the effective diameter in the present ninth example are the surface of the biconvex lens L1 on the image side (2nd surface) and the surface of the negative meniscus lens L12 on the object side (18th surface).

In the diffractive optical element GD, a planar optical glass L8, two optical members L9 and L10 formed by different resin materials, and a planar optical glass L11 are bonded in this order, and diffraction grating grooves (diffractive optical surface D) are formed on the bonded surface of the optical members L9 and L10. Therefore, the diffractive optical element GD is also a contact multi-layered diffractive optical element. Furthermore, Table 11 shows parameters of the microscope objective lens OL9 according to the ninth example shown in FIG. 17. The surface numbers shown in table 11 correspond to the surface numbers 1 to 21 shown in FIG. 17.

TABLE 11 f = 10
NA = 0.3
β = 20x
φmax = 20.08
φDOE = 9.24
d0 = 31.35
L = 63.45
f1 = 14.6
f11 = 34.88
f2 = −9.19
H = 9.88
d11 = 2.80
H1 = 9.88

| m | r | d | nd | vd |
|---|---|---|---|---|
| 1 | 767.339 | 2.80 | 1.767 | 46.8 |
| 2 | −27.673 | 0.15 | | |
| 3 | 17.748 | 5.80 | 1.498 | 82.5 |
| 4 | −39.401 | 1.10 | 1.795 | 28.7 |
| 5 | −152.771 | 0.15 | | |
| 6 | 18.584 | 1.00 | 1.795 | 28.7 |
| 7 | 10.258 | 4.80 | 1.498 | 82.5 |
| 8 | 79.110 | 0.20 | | |
| 9 | 14.416 | 3.50 | 1.498 | 82.5 |
| 10 | −30.192 | 1.00 | 1.697 | 55.5 |
| 11 | 18.289 | 1.50 | | |
| 12 | 0.000 | 2.00 | 1.517 | 64.1 |
| 13 | 0.000 | 0.20 | 1.557 | 50.2 |
| 14 | 0.000 | 0.00 | 10001.000 | −3.5 |
| 15* | 0.000 | 0.20 | 1.528 | 34.7 |
| 16 | 0.000 | 2.00 | 1.517 | 64.1 |
| 17 | 0.000 | 2.20 | | |
| 18 | −13.092 | 0.90 | 1.670 | 57.3 |
| 19 | −34.212 | 1.80 | 1.847 | 23.8 |
| 20 | −6.599 | 0.80 | 1.694 | 53.2 |
| 21 | 9.839 | | | |

Diffractive Optical Surface Data

| 15th Surface | κ = 1.0000 | A2 = 6.25000E−08 |
|---|---|---|
| | A4 = 3.55000E−14 | A6 = −3.14000E−16 |
| | A8 = 2.13000E−19 | A10 = 0.00000E+00 |

Condition Corresponding Values (1) φDOE/φmax = 0.460
(2) (−f2)/f = 0.919
(3) d0/L = 0.494
(4) f11/f = 3.488
(5) f1/f = 1.46
(6) $\Delta v_{d1}$ = 53.83
(7) $\Delta v_{d2}$ = 33.56
(8) H/d11 = 3.53
(9) |φ × H1| = 0.010

Figure 18:
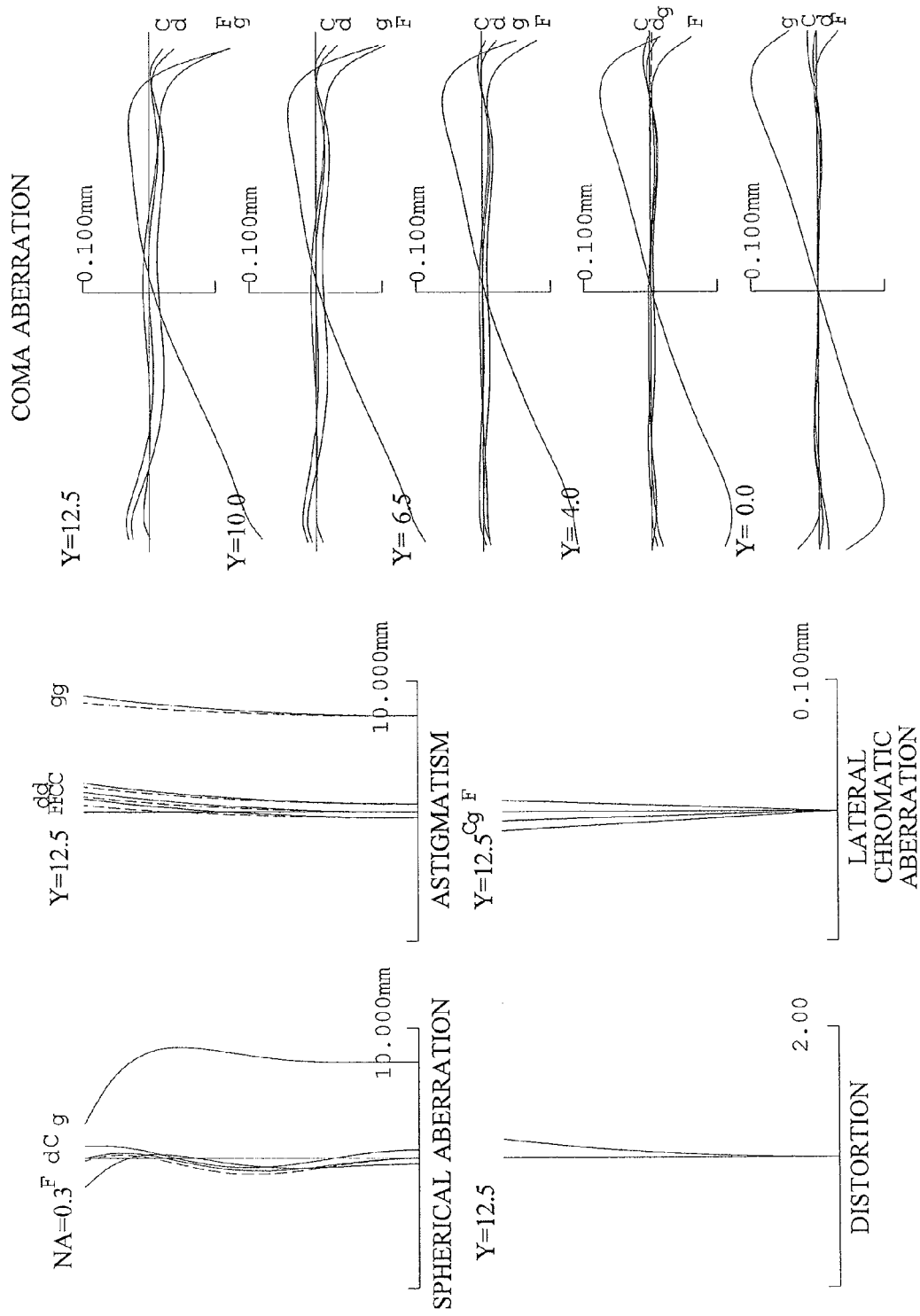
FIG. 18 is an aberrations diagram of the microscope objective lens according to the ninth example.

Among the condition corresponding values shown in table 11, $\Delta v_{d1}$ of conditional expression (6) denotes the absolute value of the difference between the Abbe numbers of the biconvex lens L2 and the negative meniscus lens L3 included in the cemented positive lens CL11, $\Delta v_{d2}$ of conditional expression (7) denotes the absolute value of the difference between the Abbe numbers of the negative meniscus lens L12 and the positive meniscus lens L13 included in the cemented negative lens CL21, d11 of conditional expression (8) denotes the on-axis lens thickness of the biconvex lens L1 (surface spacing of 1st surface), and φ of conditional expression (9) denotes the power of the 1st surface. In this way, it can be recognized that conditional expressions (1) to (8) are satisfied in the ninth example. FIG. 18 shows aberration diagrams of the spherical aberration, the astigmatism, the distortion, the lateral chromatic aberration, and the coma aberration of the microscope objective lens OL9 according to the ninth example. As is clear from each aberration diagram shown in FIG. 18, it can be recognized that the aberrations are favorably corrected in the ninth example and excellent imaging performance is secured.

REFERENCE SIGNS LIST

OL (OL1 to OL9) microscope objective lens
G1 first lens group G2 second lens group
GD diffractive optical element
CL11 cemented positive lens
CL21 cemented negative lens

The invention claimed is:

1. A microscope objective lens comprising, in order from an object side:
    a first lens group with positive refractive power; and
    a second lens group with negative refractive power, wherein
    the first lens group comprises a diffractive optical element including a diffractive optical surface,
    the diffractive optical element is arranged at a position closer to an image side than a position where a diameter of a light flux passing through the first lens group is the largest, and
    conditions of the following expressions are satisfied, in which a maximum diameter of the light flux passing through the first lens group is defined as φmax, a maximum diameter of the light flux passing through the diffractive optical surface is defined as φDOE, a focal length of the second lens group is defined as f2, and a focal length of an entire system is defined as f:

$\phi DOE/\phi max < 0.76$ $0.65 < (-f2)/f < 2.0$.

2. The microscope objective lens according to claim 1, wherein
    the first lens group comprises a lens component with positive refractive power arranged closest to an object side, and
    a condition of the following expression is satisfied, in which a distance on an optical axis from the object side to an apex of a lens surface closest to the object side of the first lens group is defined as d0, and a distance on the optical axis from the object side to an apex of a lens surface closest to an image side is defined as L:

$0.1 < d0/L < 0.6$.

3. The microscope objective lens according to claim 2, wherein
    a condition of the following expressions is satisfied, in which a focal length of the lens component closest to the object side of the first lens group is defined as f11:

$1.2 < f11/f < 19.0$.

4. The microscope objective lens according to claim 1, wherein
    a condition of the following expression is satisfied, in which a focal length of the first lens group is defined as f1:

$0.5 \leq f1/f \leq 3.5$.

5. The microscope objective lens according to claim 1, wherein
a lens surface closest to the image side of the second lens group is arranged to have a concave surface facing the image side.

6. The microscope objective lens according to claim 5, wherein
a position of an intersection of a principal ray and an optical axis is closer to the object side than the lens surface closest to the image e of the second lens group.

7. The microscope objective lens according to claim 1, wherein
the first lens group comprises at least one cemented positive lens.

8. The microscope objective lens according to claim 7, wherein
in the at least one cemented positive lens in the first lens group, when an absolute value of a difference between an Abbe number of a medium of a positive lens element and an Abbe number of a medium of a negative lens element included in the cemented positive lens is defined as $\Delta v_{d1}$, at least one of the absolute values of the differences satisfies a condition of the following expression:

$$\Delta v_{d1} > 40.$$

9. The microscope objective lens according to claim 1, wherein
the second lens group includes at least one or more cemented negative lenses.

10. The microscope objective lens according to claim 9, wherein
in the at least one cemented negative lens in the second lens group, when an absolute value of a difference between an Abbe number of a medium of a positive lens element and an Abbe number of a medium of a negative lens element included in the cemented negative lens is defined as $\Delta v_{d2}$, at least one of the absolute values of the differences satisfies a condition of the following expression:

$$\Delta v_{d2} > 30.$$

11. The microscope objective lens according to claim 1, wherein
a condition of the following expression is satisfied, in which a marginal ray height of the lens surface closest to the objects side of the first lens group is defined as H, and an on-axis lens thickness of the lens component closest to the object side of the first lens group is defined as d11:

$$2 < H/d11 < 3.6.$$

12. The microscope objective lens according to claim 1, wherein
the lens surface closest to the object side of the first lens group is arranged to have a concave surface facing the object side.

13. The microscope objective lens according to claim 1, wherein
when a refractive index relative to a d line of a medium of a lens arranged closest to the object side of the first lens group is defined as n1, a radius of curvature of the lens surface closest to the object side of the lens is defined as r, power $\phi$ of the lens surface closest to the object side of the lens is defined by the following expression $$\phi = (n1-1)/r,$$

and when an effective radius of the lens surface closest to the objects side of the lens arranged closest to the object side is defined as H1, a condition of the following expression is satisfied:

$$0.05 \leq |\phi \times H1| \leq 0.35.$$

14. A microscope objective lens comprising, in order from an object side:
a first lens group with positive refractive power; and
a second lens group with negative refractive power, wherein
the first lens group comprises a lens component with positive refractive power arranged closest to an object side and a diffractive optical element including a diffractive optical surface,
the diffractive optical element is arranged at a position closer to an image than a position where a diameter of a light flux passing through the first lens group is the largest, and
conditions of the following expressions are satisfied, in which a distance on an optical axis from the object side to an apex of a lens surface closest to the object side of the first lens group is defined as d0, a distance on the optical axis from the object side, to an apex of a lens surface closest to an image side is defined as L, a maximum diameter of the light flux passing through the first lens group is defined as $\phi$max, and a maximum diameter of the light flux passing through the diffractive optical surface is defined as $\phi$DOE:

$$0.3 < d0/L < 0.6$$

$$\phi DOE/\phi max < 0.76.$$

15. A microscope objective lens comprising, in order from an object side:
a first lens group with positive refractive power; and
a second lens group with negative refractive power, wherein
the first lens group comprises a lens component with positive refractive power arranged closest to an object side and a diffractive optical element including a diffractive optical surface,
the diffractive optical element is arranged at a position closer to an image side than a position where a diameter of a light flux passing through the first lens group is the largest, and
conditions of the following expressions are satisfied, in which a focal length of the lens component closest to the object side of the first lens group is defined as f11, a focal length of an entire system is defined as f, a maximum diameter of the light flux passing through the first lens group is defined as $\phi$max, and a maximum diameter of the light flux passing through the diffractive optical surface is defined as $\phi$DOE:

$$2 < f11/f < 10.0$$

$$\phi DOE/\phi max < 0.5.$$

16. A microscope objective lens comprising, in order from an object side:
a first lens group with positive refractive power; and
a second lens group with negative refractive power, wherein
the first lens group comprises a lens component with positive refractive power arranged closest to an object side and a diffractive optical element including a diffractive optical surface with positive refractive power, the diffractive optical element is arranged at a position closer to an image side than a position where a diameter of a light flux passing through the first lens group is the largest, and conditions of the following expressions are satisfied, in which a focal length of the lens component closest to the object side of the first lens group is defined as f11, a focal length of an entire system is defined as f, a maximum diameter of the light flux passing through the first lens group is defined as φmax, and a maximum diameter of the light flux passing through the diffractive optical surface is defined as φDOE:

$1.2 < f11/f < 6.0$ or $15.0 < f11/f < 19.0$ $\phi DOE/\phi max < 0.76.$

* * * * *